(12) United States Patent
Ishitoya et al.

(10) Patent No.: US 6,324,142 B1
(45) Date of Patent: Nov. 27, 2001

(54) SIGNAL CONVERTING DEVICE AND INFORMATION RECORDING APPARATUS EMPLOYING THE SAME

(75) Inventors: Koichi Ishitoya; Satoshi Yamaguchi, both of Tokorozawa (JP)

(73) Assignee: Pioneer Electronic Corporation, Tokyo-to (JP)

( * ) Notice: Subject to any disclaimer, the term of this patent is extended or adjusted under 35 U.S.C. 154(b) by 0 days.

(21) Appl. No.: 09/056,269

(22) Filed: Apr. 7, 1998

(30) Foreign Application Priority Data

Apr. 10, 1997 (JP) .............................. P09-092610

(51) Int. Cl.$^7$ ................................................ G11B 7/00
(52) U.S. Cl. .......................................... 369/59; 309/59.23
(58) Field of Search ................ 369/48, 59, 116, 369/121; 360/51; 386/12, 66; 375/355; 365/59.12, 59.2, 59.23

(56) References Cited

U.S. PATENT DOCUMENTS

| | | | |
|---|---|---|---|
| 5,499,227 | 3/1996 | Higasa | 369/116 |
| 5,657,308 * | 8/1997 | Maeda et al. | 369/121 |
| 5,796,692 * | 8/1998 | Hosoya | 369/48 X |
| 5,818,805 * | 10/1998 | Kobayashi et al. | 369/59 |
| 5,880,898 * | 3/1999 | Park | 360/51 |
| 5,917,793 * | 6/1999 | Uchiumi | 369/48 X |
| 5,923,628 * | 6/1999 | Nogawa | 369/48 X |

* cited by examiner

*Primary Examiner*—Aristotelis M Psitos
(74) *Attorney, Agent, or Firm*—Pitney, Hardin, Kipp & Szuch LLP

(57) ABSTRACT

The waveform recognition unit recognizes pulse waveforms of plural kinds in the digital signal, and the storage unit stores recording signal waveforms which are waveforms of the recording signals preset in correspondence with the pulse waveforms of plural kinds. The timing candidate signal generation unit generates a timing candidate signal which is a candidate of a signal indicative of at least one of a rising timing and a falling timing of the recording signal, on the basis of a reference clock signal having a period equal to a reference period of the digital signal. The timing signal selection unit selects the timing candidate signal corresponding to at least one of the rising timing and the falling timing as the timing signal, on the basis of the waveform of the recording signal corresponding to the pulse waveform recognized by the waveform recognition unit. The generation unit for generating the recording signal corresponding to the pulse waveform recognized by the waveform recognition unit on the basis of the timing signal selected by the timing selection unit and the digital signal.

9 Claims, 15 Drawing Sheets

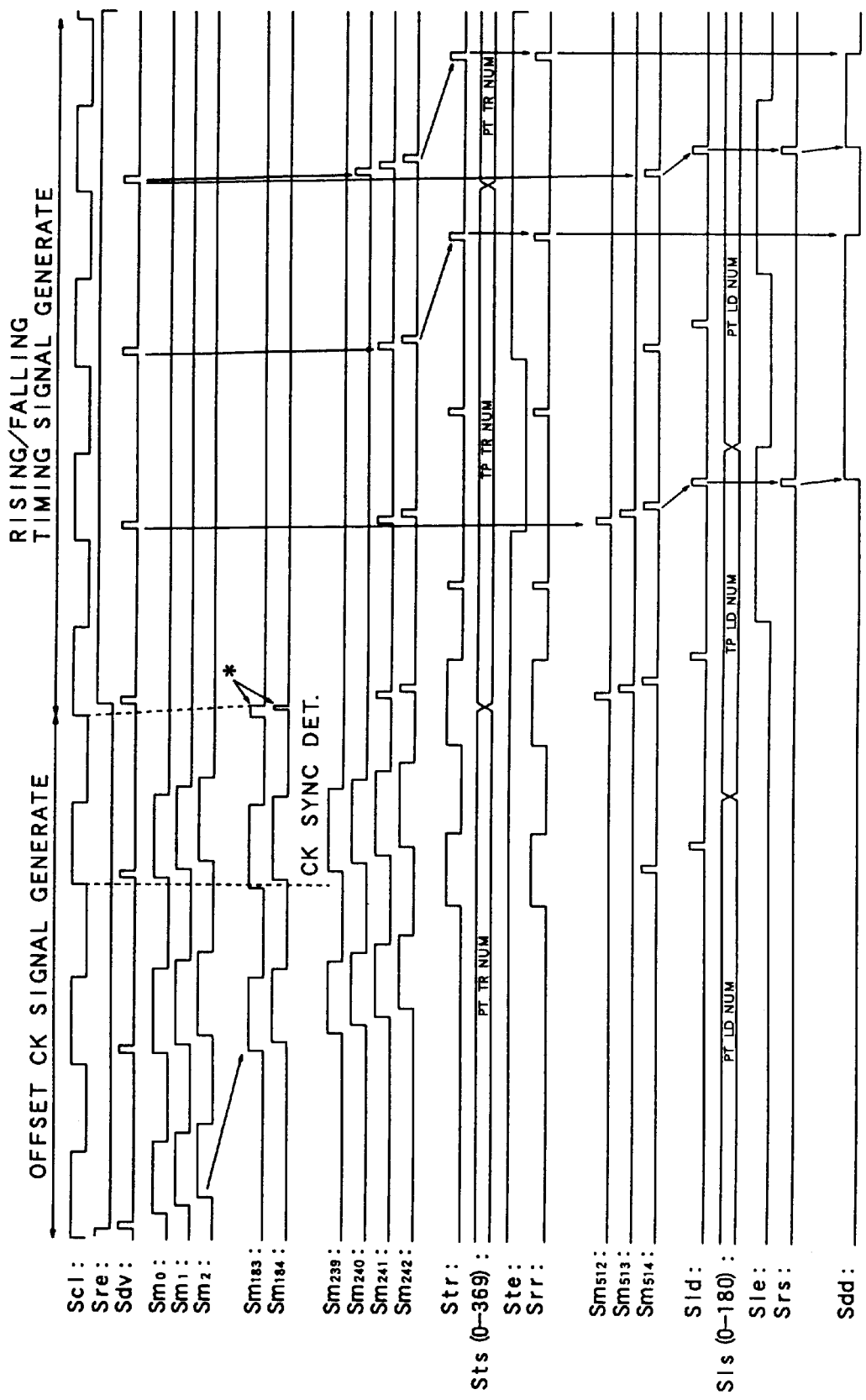

SIGNAL CONVERTING DEVICE AND INFORMATION RECORDING APPARATUS EMPLOYING THE SAME

BACKGROUND OF THE INVENTION

1. Field of the Invention

This invention relates to a digital information recording apparatus adapted to record digital information onto an information recording medium, such as a DVD-R (DVD-Recordable), which enables recording of approximately 7 times higher in density than a conventional CD-R (Compact Disk-Recordable).

2. Description of the Prior Art

Recently, there has been broadly researched and developed a so-called DVD as an information recording medium having the recording capacity of approximately 7 times higher than a conventional CD, and a DVD-R, which is a write-once type DVD, has also been researched and developed.

The DVD-R uses, as a recording layer, a dye film on which recording tracks (grooves (guide grooves) or lands) are formed in advance. In recording, a micro-size portion (where a recording pit will be formed) on the recording track is irradiated with the recording laser light, modulated according to digital information to be recorded and appropriately focused with respect to the micro-size portion, to heat the dye film at the micro-size portion due to the energy conversion into the heat energy. By this, the characteristic, such as the reflectivity, of the dye film at the micro-size portion is changed to form the recording pits. In reproduction, the digital information recorded is reproduced by using the difference in characteristic, such as the reflectivity, against the reproduction laser light of the recording pit portion and other portion where no recording laser light has been irradiated. In order to achieve the above mentioned high recording capacity in DVD-R, the information pits should be formed such that the length of the pit in the radial direction of the disc (i.e., pit width) is approximately 0.4 $\mu$m, the length of the pit in the circumferential direction (i.e., pit length) is approximately 0.4 $\mu$m for the minimum length pit and approximately 1.9 $\mu$m for the maximum length pit.

In the case of the conventional CD-R using the above mentioned dye film, there may be such a problem that the reproduction waveform is distorted if the recording pits are recorded by the laser light modulated according to the digital information to be recorded and then they are reproduced. One cause of this distortion is that the shape of the recording pit at front and rear portions are asymmetric in the circumferential direction of the CD-R, i.e., the pit shape is thin at its front portion and thick at its end portion, forming a tear-like shape, thereby introducing the distortion. Specifically, referring to FIGS. 1A to 3A, if the information is recorded by the laser light modulated to have the waveform shown in FIG. 1A, the temperature distribution of the area of the dye film irradiated with the laser light includes the lower temperature area at the front portion and the higher temperature area at the rear portion due to the heat storage effect as shown in FIG. 1B. As a result, the recording pits of tear-drop shape shown in FIG. 1C are formed.

Another factor which deteriorates the symmetricalness of the recording pit shape is that the light spot formed at the laser light irradiation position covers beyond the area where the recording pit should be formed. Namely, when the laser light is irradiated, the light spot covers the area other than the pit recording area so that the recording pit formed becomes asymmetrical at its front and rear portions in relation to the digital information to be recorded.

In order to overcome this problem, the conventional CD-R does not modulate the laser light by the modulation signal obtained by simply modulating the pulse signal by the digital signal to be recorded. Namely, the pulse signal is modulated by the digital signal to be recorded, and then the waveform of the signal thus modulated is then waveform-converted to obtain the recording signal corresponding to the digital signal to be recorded. Thereafter, the laser light is modulated by the recording signal and the recording pits are formed using the thus modulated laser light.

Specifically, as shown in FIG. 2, the modulated signal is further waveform-converted such that a certain time period of the recording signal, corresponding to the front portion of the recording pit, is set to zero and the following period of the recording signal includes successive short-period pulses. In the example shown in FIG. 2, for the modulated signal indicating high level for 11T period, the initial potion of the recording signal is set to zero for the time period 1.5T, and the later half of the recording signal is waveform-converted to include successive pulses of 0.5T length, thereby producing the recording signal as shown. Then, the laser light is modulated by this recording signal and then irradiated on the dye film. Here, "T" represents the time period corresponding to a single reference clock period in the digital signal to be recorded. In the case of DVD-R, it is standardized that the digital signal to be recorded is constituted by the combination of 12 kinds of data pulses having the pulse lengths from 3T to 14T and the sync pulse of 14T length. By modulating the laser light with the waveform-modulated recording signal, it may be possible to avoid the undesirable temperature distribution on the dye film as shown in FIG. 1B and to form the oval recording pits having desired symmetricalness corresponding to the digital signal to be recorded. Referring to the waveform shown in FIG. 2, the initial pulse having 1.5T length will be hereinafter referred to as "top pulse (TP)" and the successive pulses of 0.5T length, following the top pulse, will be hereinafter referred to as "pulse train (PT)".

In the conventional CD-R, in order to waveform-convert the modulated signal into the recording signal as shown in FIG. 2, analog type delay lines (e.g., configured by concentrated constant elements, distributed constant elements, or active element such as logic gates) and AND circuits or flop-flop circuits are mainly employed. In the conventional CD-R, the reference clock period is about 230 nsec, and the accuracy of about 10 nsec is necessary and sufficient for the waveform conversion of the modulated signal into the recording signal. Therefore, the above mentioned delay lines can be used to configure the waveform conversion circuit.

On the contrary, the reference clock period for DVD-R is set to 37 nsec to achieve the high recording capacity, and it is further required that the accuracy of the waveform conversion is very high. Specifically, the resolution and reproducibility of about some nano seconds (1 nsec if possible) is required. It is further necessary to enable various setting change (such as a change of converted waveform) with such accuracy being maintained.

However, the above mentioned delay lines available have the resolution of about 5 nsec. Further, it is necessary to account for the error in accuracy and/or variation during use of about ±10% of the total delay time. Further, accounting for the irregularity of delay between the connections connecting the respective elements, the substantive accuracy is further deteriorated. In a configuration with variable delay time, the serial connection of special high-resolution delay lines should be employed, and total resolution is greatly deteriorated due to the irregularity of the respective delay lines.

SUMMARY OF THE INVENTION

It is an object of the present invention to provide a digital information recording apparatus which can convert the modulated signal into the recording signal to achieve correct recording of desired digital signal with maintaining the resolution, accuracy and reproducibility desired for DVD-R and can be simply configured with lower cost.

According to one aspect of the present invention, there is provided a signal converting device for converting a digital signal into a recording signal to be recorded on a storage medium, including: a waveform recognition unit for recognizing pulse waveforms of plural kinds in the digital signal; a storage unit for storing recording signal waveforms preset in correspondence with the pulse waveforms of plural kinds; a timing candidate signal generation unit for generating a timing candidate signal which is a candidate of a signal indicative of at least one of a rising timing and a falling timing of the recording signal on the basis of a reference clock signal having a period equal to a reference period of the digital signal; a timing signal selection unit for selecting the timing candidate signal corresponding to at least one of the rising timing and the falling timing as the timing signal on the basis of the waveform of the recording signal corresponding to the pulse waveform recognized by the waveform recognition unit; and a generation unit for generating the recording signal corresponding to the pulse waveform recognized by the waveform recognition unit on the basis of the timing signal selected by the timing selection unit and the digital signal.

In accordance with the device thus configured, the waveform recognition unit recognizes pulse waveforms of plural kinds in the digital signal, and the storage unit stores recording signal waveforms, which are waveforms of the recording signals, preset in correspondence with the pulse waveforms of plural kinds. The timing candidate signal generation unit generates a timing candidate signal which is a candidate of a signal indicative of at least one of a rising timing and a falling timing of the recording signal, on the basis of a reference clock signal having a period equal to a reference period of the digital signal. The timing signal selection unit selects the timing candidate signal corresponding to at least one of the rising timing and the falling timing as the timing signal, on the basis of the waveform of the recording signal corresponding to the pulse waveform recognized by the waveform recognition unit. Then, the generation unit generates the recording signal corresponding to the pulse waveform recognized by the waveform recognition unit on the basis of the timing signal selected by the timing selection unit and the digital signal.

Namely, the device selects the timing signal corresponding to the timing, at which the recording signal corresponding to the pulse waveform of the digital signal is to be produced, from the timing candidate signals, and generates the recording signal. Therefore, the digital signal may be converted into the recording signal with high accuracy and reproducibility. As a result, the digital signal may be recorded on the storage medium with forming accurately shaped recording pits.

The timing candidate signal generation unit may generate a rising timing candidate signal which is a candidate of a signal indicative of the rising timing of the recording signal and a falling timing candidate signal which is a candidate of a signal indicative of the falling timing of the recording signal. In addition, the timing signal selection unit may include: a rising timing signal selection unit for selecting the rising timing candidate signal corresponding to the rising timing as the rising timing signal on the basis of the waveform of the recording signal corresponding to the pulse waveform recognized by the waveform recognition unit, and a falling timing signal selection unit for selecting the falling timing candidate signal corresponding to the falling timing as the falling timing signal on the basis of the waveform of the recording signal corresponding to the pulse waveform recognized by the waveform recognition unit.

In a preferred embodiment, the timing candidate signal generation unit may include a delay unit including a plurality of serially-connected delay elements each having a delay time shorter than the period of the reference clock signal, and outputting the output signals of the delay elements as the rising timing candidate signal and the falling timing candidate signal. Thereby, the variation of the delay time in the delay elements can be appropriately compensated for.

Still further, a detection unit may be provided for comparing the plurality of the rising timing candidate signals and the plurality of the falling timing candidate signals with the reference clock signal in a time axis basis and for detecting variations of the delay times of the delay elements to output a variation detection signal. In that case, the rising timing signal selection unit selects the rising timing signal on the basis of the recording signal waveform and the variation detection signal, and the falling timing signal selection unit selects the falling timing signal on the basis of the recording signal waveform and the variation detection signal.

In a specific embodiment, the delay elements may include buffer elements.

Further, a differentiation unit may be employed for differentiating the reference clock signal to produce a reference rising timing signal indicative of the rising timing of the reference clock signal. In that case, the timing candidate signal generation unit may include a delay unit including a plurality of serially connected delay elements each having a delay time shorter than the period of the reference rising timing signal and delaying the reference rising timing signal for the delay time. The rising timing signal selection unit outputs one of the output signals of the delay elements as the rising timing signal, and the falling timing signal selection unit outputs one of the output signals of the delay elements as the falling timing signal.

Still further, the signal converting device may further include: a first delay unit including a plurality of serially connected first delay elements each having a delay time shorter than the period of the reference clock signal; a detection unit for comparing the respective output signals of the first delay elements with the reference clock signal in the time axis basis and detecting variations of the delay times of the first delay elements to output the variation detection signal; a differentiation unit for differentiating the reference clock signal to produce a reference rising timing signal indicative of the rising timing of the reference clock signal. The timing candidate signal generation unit may include a second delay unit including a plurality of serially connected second delay elements of the same type as the first delay elements each having a delay time shorter than the period of the reference rising timing signal and for delaying the reference rising timing signal for the delay time. The rising timing signal selection unit outputs one of the output signals of the second delay elements as the rising timing signal on the basis of the recording signal waveform and the variation detection signal, and the falling timing signal selection unit outputs one of the output signals of the second delay elements as the falling timing signal on the basis of the recording signal waveform and the variation detection signal.

It is preferred that the first delay elements and the second delay elements include selection elements for selecting one of the output signal of the first or second delay elements of one stage prior thereto in the serial connection and the reference rising timing signal, the rising timing signal selection unit controls the selection by the one selection elements corresponding to the second delay elements to output the rising timing signal on the basis of the recording signal waveform and the variation detection signal, and the falling timing signal selection unit controls the selection by the one selection elements corresponding to the second delay elements to output the falling timing signal on the basis of the recording signal waveform and the variation detection signal.

According to another aspect of the present invention, there is provided a digital signal recording apparatus including: the signal converting device described above; and a recording unit for recording the recording signal produced by the signal converting device on the storage medium.

In accordance with the digital signal recording apparatus thus configured, the digital signal may be converted into the recording signal with high accuracy and reproducibility. As a result, the digital signal may be recorded on the storage medium with forming accurately shaped recording pits.

The nature, utility, and further features of this invention will be more clearly apparent from the following detailed description with respect to the preferred embodiments of the invention when read in conjunction with the accompanying drawings briefly described below.

BRIEF DESCRIPTION OF THE DRAWINGS

FIG. 15 is a timing chart illustrating the operation of the power control circuit according to the second embodiment of the invention.

DETAILED DESCRIPTION OF THE PREFERRED EMBODIMENTS

The preferred embodiment of the present invention will now be described below with reference to the attached drawings. It is noted that the following description is directed to the case where the present invention is applied to an information recording apparatus for recording digital information transmitted from a host computer onto a DVD-R.

[I] Information Recording Apparatus

First, the description will be given of the overall configuration and operation of the information recording apparatus according to the present invention. In the following description, it is assumed that the pre-pits, carrying the address information on the DVD-R and the like, are formed on the recording tracks in advance. In recording the digital information, the address information on the DVD-R is obtained by detecting the pre-pits, in advance, to detect the position where the information is to be recorded. Thus, the recording is performed.

Figures 1A, 1B, 1C:
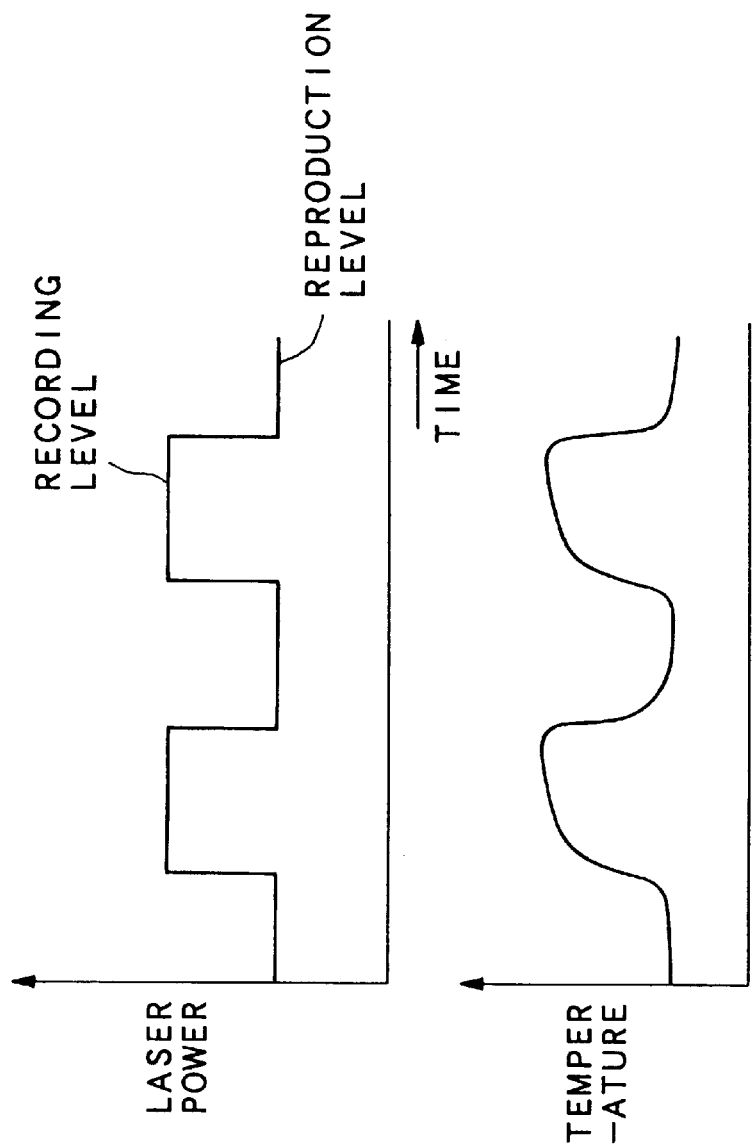
FIGS. 1A to 1C are diagrams illustrating the problems of the prior art device.
Figure 2:
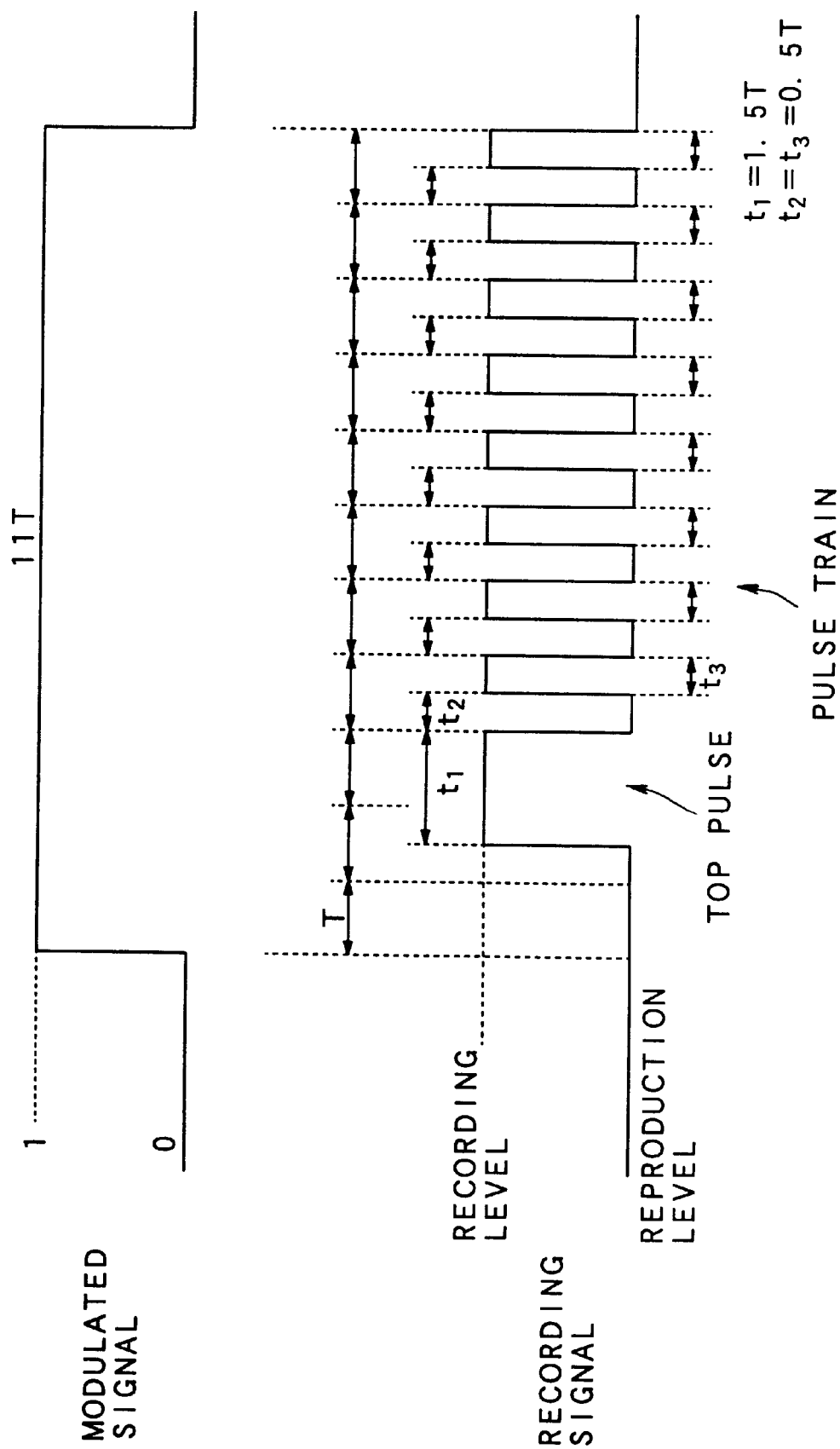
FIG. 2 is a timing chart illustrating the relationship between a modulated signal and the recording signal obtained by the waveform conversion of the modulated signal.
Figure 3:
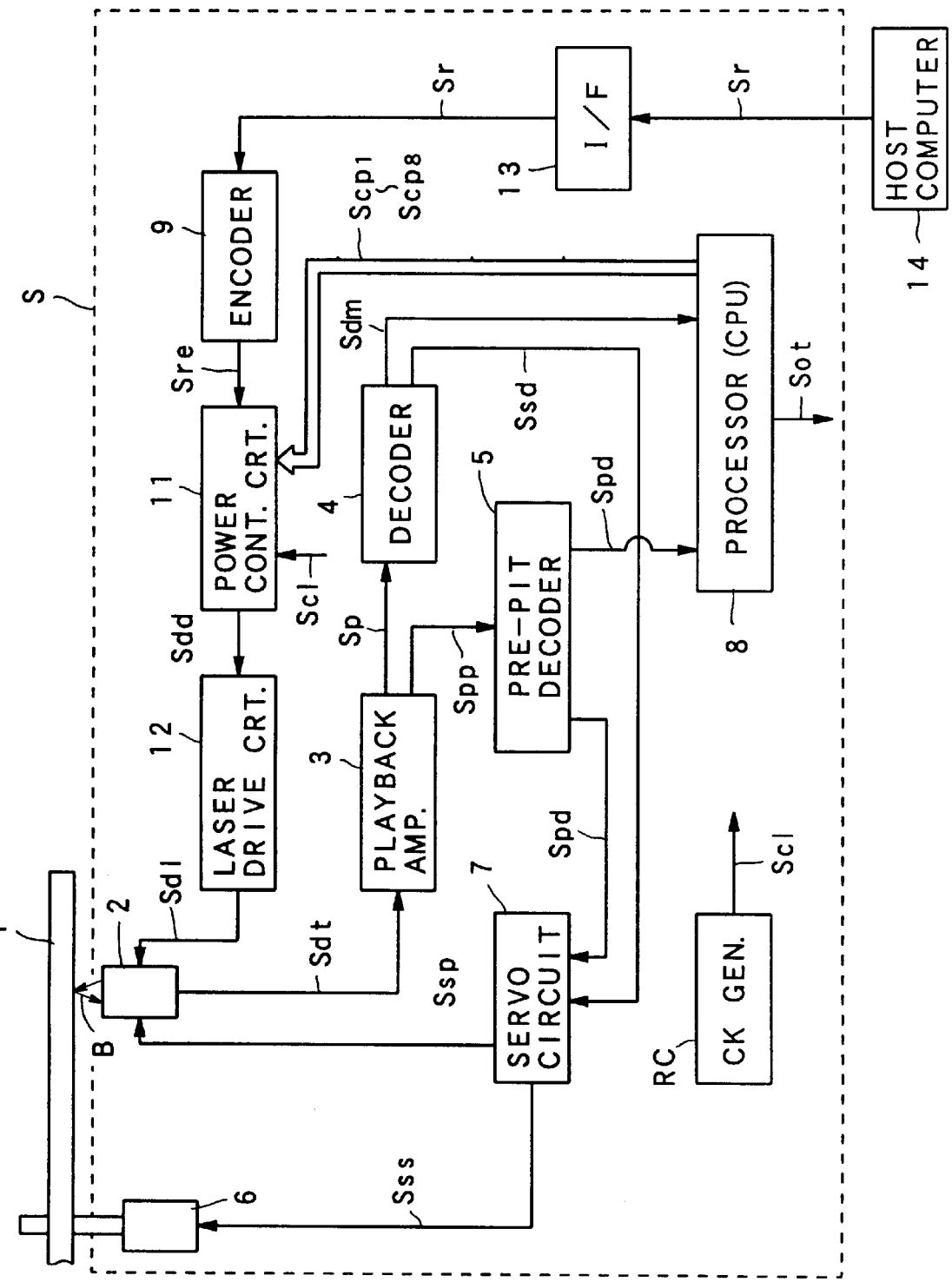
FIG. 3 is a block diagram schematically illustrating the configuration of the information recording apparatus according to the present invention.

As shown in FIG. 3, the information recording apparatus S according to the present invention includes the pickup 2, the playback amplifier 3, the decoder 4, the pre-pit signal decoder 5, the spindle motor 6, the servo circuit 7, the processor 8, the encoder 9, the power control circuit 11, the laser drive circuit 12, the interface 13 and the clock generator RC. The information recording apparatus S receives the digital information Sr from the external host computer 14 via the interface 13.

Next, the whole operation of the apparatus will be described. The pickup 2 includes a laser diode, a polarization beam splitter, an objective lens, photodetectors, etc., which are not shown, and irradiates the light beam B on the information recording surface of the DVD-R 1 on the basis of the laser drive signal Sdl. Then, the pickup 2 receives the reflected light beam to detect the pre-pits and record the digital information. In addition, if the digital information has already been recorded, the pickup 2 detects the recorded digital information from the reflected light beam.

The playback amplifier 3 amplifies the detected signal Sdt including information corresponding to the pre-pits and outputted by the pickup 2, and outputs the pre-pit signal Spp corresponding to the pre-pits and the amplified signal Sp corresponding to the digital information recorded. The decoder 4 applies the 8–16 modulation and de-interleaving on the amplified signal Sp to decode it, and outputs the demodulated signal Sdm and the servo demodulated signal Ssd. The pre-pit decoder 5 decodes the pre-pit signal Spp to output the demodulated pre-pit signal Spd.

The servo circuit 7 outputs the pickup servo signal Ssp for the focus and tracking servo controls by the pickup 2 on the basis of the demodulated pre-pit signal Spd and the servo demodulated signal Ssd. Further, the servo circuit 7 outputs the spindle servo signal Sss for the rotation control of the spindle motor 6 which rotates the DVD-R 1. At the same time, the processor 8 outputs the playback signal Sot, corresponding to the recorded digital signal, to an external unit based on the demodulated signal Sdm. The processor also performs total control of the information recording apparatus S.

The interface 13 performs interfacing operation to receive the digital information Sr transmitted from the host computer 14 and supplies it to the encoder 9 under the control by the processor 8. The encoder 9, including an ECC (Error Correction Code) generator, an 8–16 modulator, a scrambler, etc., produces the ECC block which is an error correction unit in reproduction. Further, the encoder 9 applies the interleaving and the 8–16 modulation on the ECC block to produce the modulated signal Sre. The power control circuit 11 outputs the recording signal Sdd, based on the modulated signal Sre, to control the output of the laser diode (not shown) in the pickup 2. At this time, the power control circuit 11 is supplied with the reference clock signal Scl described later and the register setting signal $Scp_1$ to $Scp_8$ from the processor 8. The laser drive circuit 12 outputs, based on the recording signal Sdd, the laser drive signal Sdl which drives the laser diode to emit the light beam B. The clock generator RC generates the reference clock Scl with which various components of the apparatus S operate. The period of the reference clock Scl is set to 1T as already mentioned.

[II] 1st Embodiment of the Power Control Circuit

Next, the description will be given of the power control circuit 11 according to the first embodiment with reference to FIGS. 4 to 11.

(i) Whole Configuration and Operation

Figure 4:
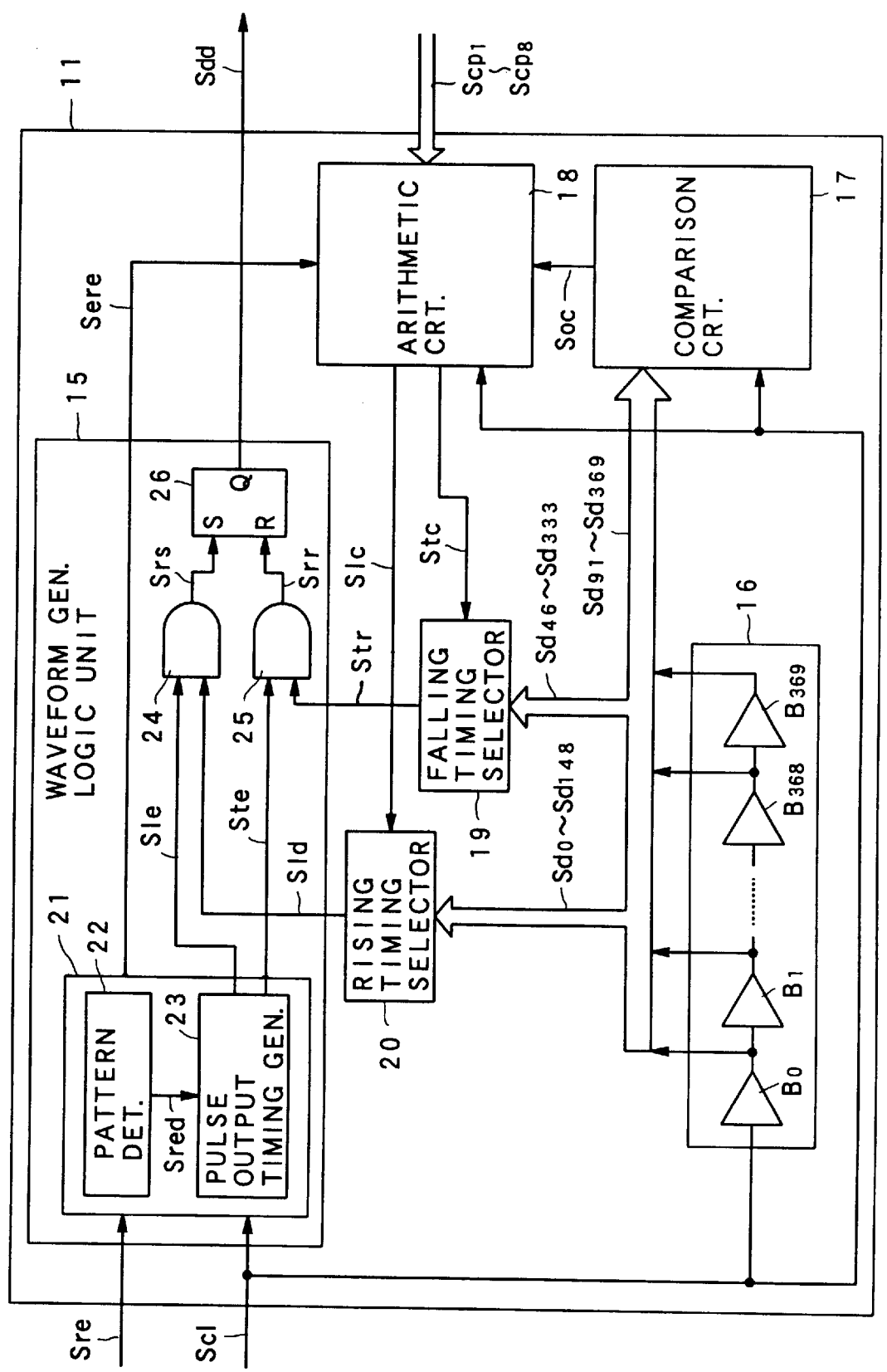
FIG. 4 is a block diagram illustrating schematic configuration of the power control circuit.
Figure 5A:
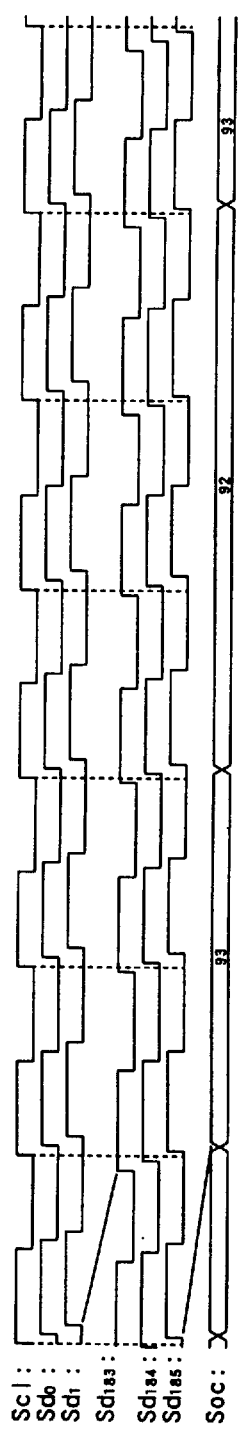
FIGS. 5A to 5C are timing charts illustrating the operation of the power control circuit.
Figure 5B:
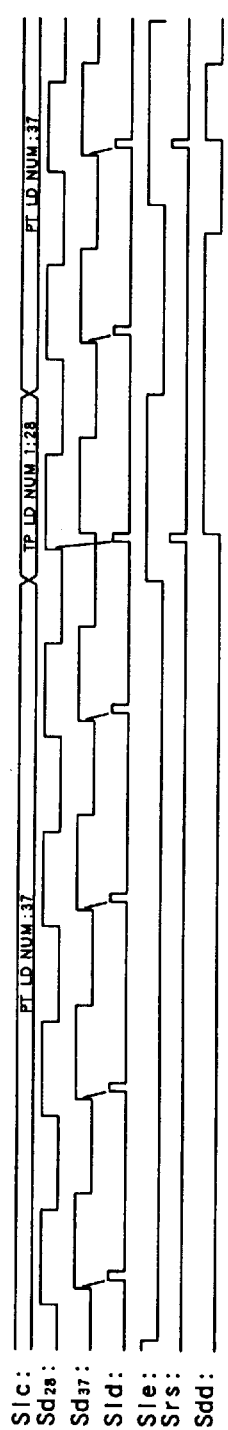
Figure 5C:
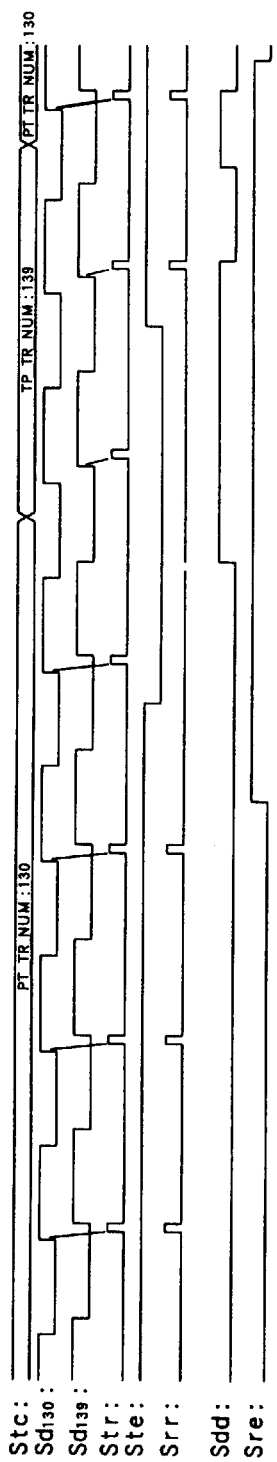

First, the whole configuration and operation of the power control circuit 11 will be described with reference to FIGS. 4, 5A–5C. FIG. 4 is a block diagram illustrating overall configuration of the power control circuit, and FIGS. 5A–5C are timing charts illustrating the signals appearing in the power control circuit 11. FIGS. 5A–5C show the waveform conversion of the modulated signal Sre, in which the combination of space/mark (i.e., "H" level period and "L" level period of the modulated signal Sre) is 3T/4T, into the recording signal Sdd. In the following description, data relating to the setting of the rising positions of the pulses (i.e., the top pulse and the pulse train mentioned above) in the recording signal Sdd is indicated by the reference including "LD", and data relating to the setting of the falling positions of the pulses in the recording signal Sdd is indicated by the reference including "TR".

As shown in FIG. 4, the power control circuit 11 includes the waveform generation logic unit 15, the delay circuit 16, the comparison circuit 17, the arithmetic circuit 18, the falling timing selector 19 and the rising timing selector 20. The waveform generation logic unit 15 includes the signal generation unit 21, the AND circuits 24 and 25, and the flip-flop circuit 26. Further, the signal generation unit 21 includes the pattern detector 22 and the pulse output timing generator 23.

The delay circuit 16 includes 370 buffer elements $B_0$ to $B_{369}$ in serial connection. The operation time (i.e., the time period from the data input to the data output) for the buffer elements $B_0$ to $B_{369}$ is nominally 0.2 nsec, however, it generally varies within the range of 50% to 200%, i.e., between 0.1 nsec and 0.4 nsec, due to the variation of the environmental temperature. Here, it is possible to assume that the variation is same for all buffer elements (i.e., the operation times of all buffer elements are same, and their variations are also same).

Next, the whole operation of the power control circuit will be described with reference to FIGS. 4 and 5A to 5C.

First, the operation of the delay circuit 16 and the comparison circuit 17 will be described with reference to FIGS. 4 and 5A. It is noted that the comparison circuit 17 has a function to detect how many (stages of) buffer elements the period (1T) of the reference clock signal Scl corresponds to, so as to grasp the variation amount of the buffer elements $B_0$ to $B_{369}$ constituting the delay circuit 16, to enable the generation of the correct recording signal Sdd. The reference clock signal Scl inputted to the power control circuit 11 is supplied to the delay circuit 16 to be successively supplied to the respective buffer elements $B_0$ to $B_{369}$. Each of the buffer elements $B_0$ to $B_{369}$ gives the delay time, corresponding to the above-mentioned operation time, to the input signal, and outputs the signal thus delayed. Each of the output signals of the buffer elements $B_0$ to $B_{369}$ is supplied to the buffer element of the following stage, and simultaneously is outputted separately as the delay signals $Sd_0$ to $Sd_{369}$. Out of those delay signals $Sd_0$ to $Sd_{369}$, only the delay signals $Sd_{91}$ to $Sd_{369}$ are supplied to the comparison circuit 17 in a parallel manner. The reason of this is as follows. Assuming that the operation time of each of the buffer elements is 0.1 nsec, one period of the reference clock Scl (37 nsec) corresponds to 370 buffer elements (i.e., the delay signal $Sd_{369}$ outputted by the buffer element $B_{369}$ has the waveform obtained by delaying the reference clock Scl for one period). Hence, by inputting the delay signal $Sd_{369}$ to the comparison circuit 17, the comparison circuit 17 can recognize that one period of the reference clock Scl corresponds to 370 buffer elements. On the other hand, assuming that the operation time of the buffer elements $B_0$ to $B_{369}$ is 0.4 nsec, one period of the reference clock Scl corresponds to 92 buffer elements (i.e., the delay signal $Sd_{91}$ has a waveform obtained by delaying the reference clock Scl for one period). Hence, by inputting the delay signal $Sd_{91}$ to the comparison circuit 17, the comparison circuit 17 can recognize that one period of the reference clock Scl corresponds to 92 buffer elements. In other words, by inputting the delay signals $Sd_1$ to $Sd_{369}$ to the comparison circuit 17, it is possible, in any cases, to recognize how many buffer elements one period of the reference clock Scl corresponds to. This is why only the delay signals $Sd_{91}$ to $Sd_{369}$ are supplied to the comparison circuit 17.

The comparison circuit 17 compares the delay signals $Sd_{91}$ to $Sd_{369}$, respectively, with the reference clock signal Scl inputted simultaneously thereto, and detects which one of the delay signals $Sd_{91}$ to $Sd_{369}$ has the waveform obtained by delaying the reference clock signal Sc for one period (1T). In the case shown in FIG. 5A, the comparison circuit 17 determines that the delay signal $Sd_{185}$ is synchronized with the reference clock signal Scl, and hence outputs the offset clock signal Soc, to the arithmetic circuit 18, indicating the buffer element which corresponds to the delay signal $Sd_{185}$ and the period of the reference clock Scl. It is noted that, in FIG. 5A, the offset clock signal Soc corresponding to the delay signal $Sd_{185}$ is the data indicated by the reference "93" (=185−92). The operation of the comparison circuit 17 will be described later in more detail.

The arithmetic circuit 18 outputs the falling selection signal Stc and the rising selection signal Slc based on the register setting signals $Scp_1$ to $Scp_8$ for setting the rising and falling positions of the respective pulses of the recording signal Sdd, the offset clock signal Soc, the reference clock signal Scl and the register selection signal Sere from the waveform generation logic unit 15. The falling selection signal Stc is used to select the delay signal for setting the falling positions in the respective pulses of the recording signal Sdd out of the delay signals $Sd_{46}$ to $Sd_{333}$ supplied to the falling timing selector 19. The rising selection signal Slc is used to select the delay signal for setting the rising positions in the respective pulses of the recording signal Sdd out of the delay signals $Sd_0$ to $Sd_{148}$ supplied to the rising timing selector 20. The operation of the arithmetic circuit 18 will be described later in more detail.

Next, the operation of the rising timing selector 20 and the waveform generation logic unit 15 will be roughly described with reference to FIGS. 4 and 5B. As described above, the rising timing selector 20 receives the delay signals $Sd_0$ to $Sd_{148}$ out of the delay signals outputted from the delay circuit 16. The rising timing selector 20 selects, based on the rising selection signal Slc, the delay signal indicative of the rising timings of the pulses in the recording signal Sdd from the delay signals inputted (each delay signal has the phase shift corresponding to the delay time of the buffer elements), and outputs the selected signal to the AND circuit 24 as the rising timing signal Sld. The rising timing signal Sld includes one pulse, in each 1T period, indicative of the rising timing of the pulse in the recording signal Sdd. Since this pulse is selected from the delay signals based on the rising selection signal Slc, the rising timings of the pulses in the recording signal Sdd can be controlled with the accuracy of the delay times (the above-mentioned operation time such as 0.2 nsec) in the respective delay signals by controlling the rising selection signal Slc using the register selection signal Sere described later.

This operation will be described in more detail with reference to FIG. 5B. In the case of FIG. 5B, the arithmetic circuit 18 outputs the rising selection signal Slc (selected by the arithmetic circuit 18 based on the register selection signal Sere and indicated by the reference "PT LD NUM;37") to select the delay signal $Sd_{37}$ as the rising timing signal SId indicative of the rising of the respective pulses in the pulse train. Also, the arithmetic circuit 18 outputs the rising selection signal Slc (selected by the arithmetic circuit 18 based on the register selection signal Sere and indicated by the reference "TP LD NUM 1;28") to select the delay signal $Sd_{28}$ as the rising selection signal Sld indicative of the rising of the top pulse. The rising timing selector 20 outputs the rising timing signal Sld, which becomes "H" at the rising timing of the delay signal $Sd_{37}$ and the rising timing of the delay signal $Sd_{28}$, on the basis of the rising selection signal Slc.

The AND circuit 24 receives, at its one input terminal, the rising enable signal Sle, from the pulse output timing generator 23, which is set in correspondence with the combination of the mark/space in the modulated signal Sre to be converted. This rising enable signal Sle is used to select the pulses in the rising timing signals Sld so that the waveform of the recording signal Sdd after the waveform-conversion is the combination of the top pulse and the pulse train corresponding to the respective pulse waveforms. In other words, the rising enable signal Sle is used to select the pulse which is allowed to be outputted as the pulse (the set signal Srs described later) indicative of the rising of the pulse waveform in the recording signal Sdd out of the pulses in the rising timing signals Sld. Accordingly, the pulse output timing generator 23 generates 12 kinds of rising enable signals Sle in correspondence with the 12 kinds of waveforms of 3T to 14T in the modulated signal Sre, and outputs one rising enable signal Sle corresponding to the waveform of the modulated signal Sre, out of the rising enable signals Sle thus generated, recognized by the pattern detector 22.

The AND circuit 24 produces the logical product of the rising timing signal Sld and the rising enable signal Sle to output, to the set terminal of the flop-flop circuit 26, the set signal Srs which indicates the rising timings of the top pulses or the pulse train. The flip-flop circuit 26 outputs the recording signal Sdd, based on the set signal Srs and the reset signal Srr described later (inputted to the reset terminal of the flip-flop circuit 26), which is "H" at the timing of the pulses of the set signal Srs and "L" at the timing of the pulses of the reset signal Srr.

Next, the operation of the falling timing selector 19 and the waveform generation logic unit 15 will be roughly described with reference to FIGS. 4 and 5C. As described above, the falling timing selector 19 receives the delay signals $Sd_{46}$ to $Sd_{333}$ from the delay circuit 16. The falling timing selector 19 selects, based on the falling selection signal Stc, the delay signal indicative of the falling of the pulses of the recording signal Sdd from the delay signal inputted, and outputs the selected signal as the falling timing signal Str to the AND circuit 25. The falling timing signal Str includes, in each 1T period, one pulse indicative of the falling timing of the pulses in the recording signal Sdd. Since the pulses are selected from the delay signals on the basis of the falling selection signal Stc, the falling timing of the pulses in the recording signal Sdd can be controlled with the accuracy of the delay times (i.e., operation times) of the respective delay signals by controlling the falling selection signals Stc using the register selection signal Sere described later.

This operation will be described in more detail with reference to FIG. 5C. In the case of FIG. 5C, the arithmetic circuit 18 outputs the falling selection signal Stc (selected by the arithmetic circuit 18 based on the register selection signal Sere and indicated by the reference "TP TR NUM 1;39") to select the delay signal $Sd_{139}$ as the falling timing signal Str indicative of the falling of the top pulse. Also, the arithmetic circuit 18 outputs the falling selection signal Stc (selected by the arithmetic circuit 18 based on the register selection signal Sere and indicated by the reference "PT TR NUM;130") to select the delay signal $Sd_{130}$ as the falling selection signal Str indicative of the falling of the pulse train. The falling timing selector 19 outputs the falling timing signal Str, which becomes "H" at the rising timing of the delay signal $Sd_{139}$ and the rising timing of the delay signal $Sd_{130}$, on the basis of the respective falling selection signals Stc.

The AND circuit 25 receives, at its one input terminal, the falling enable signal Ste, from the pulse output timing generator 23, which is set in correspondence with the combination of the mark/space in the modulated signal Sre to be converted. This falling enable signal Ste is used to select the pulses in the falling timing signals Str so that the waveform of the recording signal Sdd after the waveform-conversion is the combination of the top pulse and the pulse train corresponding to the respective pulse waveforms. In other words, the falling enable signal Ste is used to select the pulse which is allowed to be outputted as the pulse (the reset signal Srr described later) indicative of the falling of the pulse waveform in the recording signal Sdd out of the pulses in the falling timing signals Str. Accordingly, similarly to the rising enable signal Sle, the pulse output timing generator 23 generates 12 kinds of falling enable signals Ste in correspondence with the 12 kinds of waveforms of 3T to 14T in the modulated signal Sre, and outputs one falling enable signal Ste corresponding to the waveform of the modulated signal Sre, out of the falling enable signals Ste thus generated, recognized by the pattern detector 22.

The AND circuit 25 produces the logical product of the falling timing signal Str and the falling enable signal Ste to output, to the reset terminal of the flop-flop circuit 26, the reset signal Srr which indicates the falling timings of the top pulse or the pulse train. The flip-flop circuit 26 outputs the recording signal Sdd, based on the set signal Srs and the reset signal Srr, which changes to "H" at the timing of the pulses of the set signal Srs and changes to "L" at the timing of the pulses of the reset signal Srr.

The recording signal Sdd shown in FIG. 5C represents the case where the modulated signal Sre having the mark/space combination of 3T/4t is waveform-converted. Comparing the recording signal Sdd and the modulated signal Sre with respect to the time-base axis, the recording signal Sdd takes "L" for the initial 1.5T period in the "H" period of the modulated signal Sre shown as the lowest signal of FIG. 5C, and takes "H" in the following 1.5T period. The recording signal Sdd shows the combination of "H" and "L" periods, both being 0.5T, in the periods of 1.0T following thereto.

(ii) Detailed Configuration and Operation

Next, detailed configuration and operation of the components constituting the power control circuit 11 will be described with reference to FIGS. 6 to 11.

Figure 6:
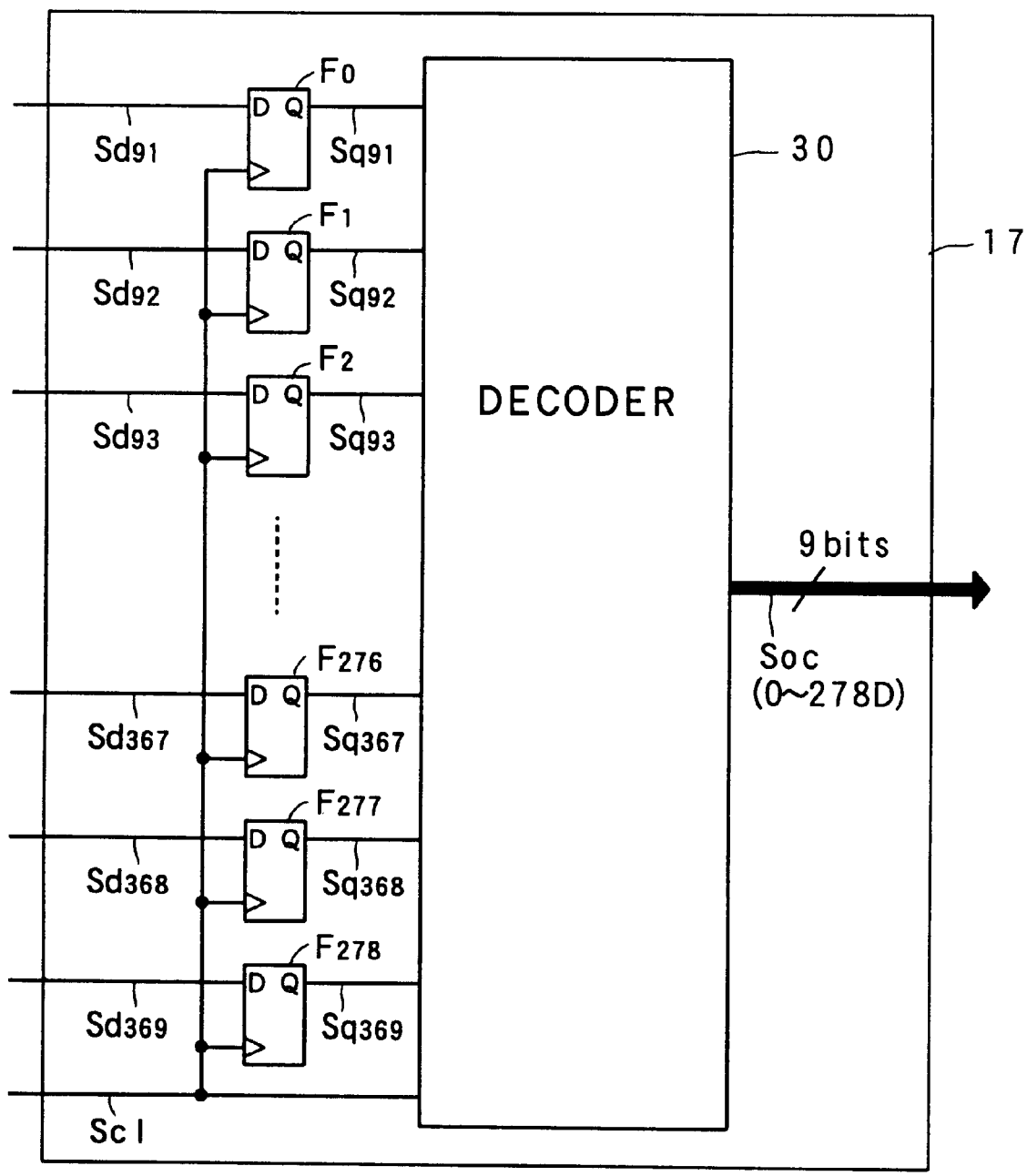
FIG. 6 is a block diagram illustrating the detailed configuration of the comparison circuit.
Figure 7:
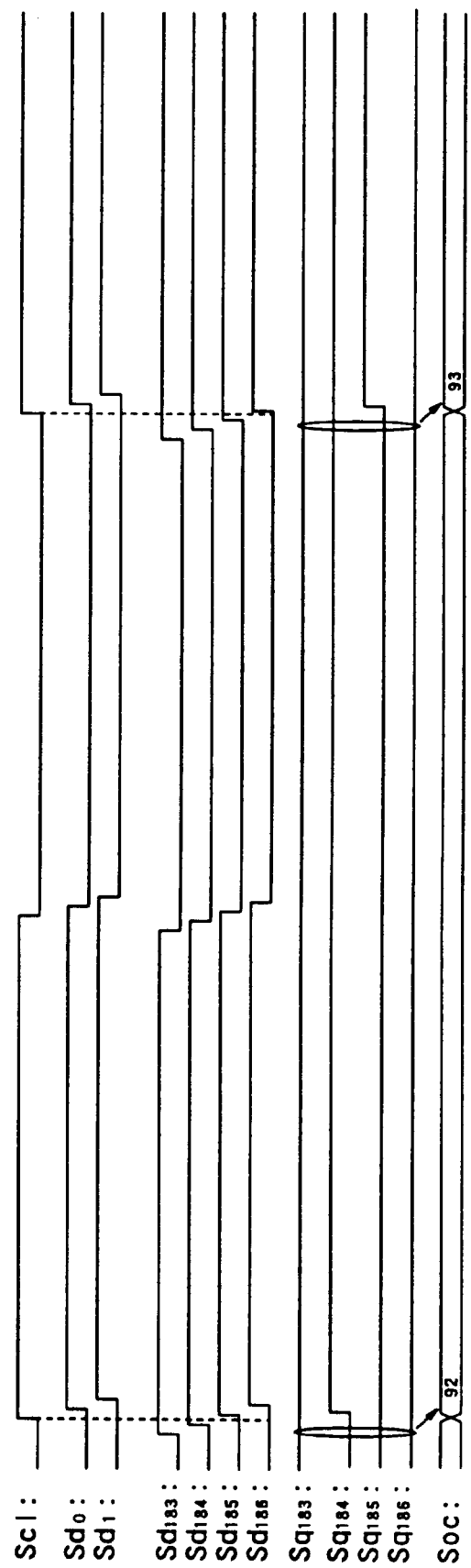
FIG. 7 is a timing chart illustrating the operation of the comparison circuit.

First, the detailed configuration and the operation of the comparison circuit 17 will be described with reference to FIGS. 6 and 7. As shown in FIG. 6, the comparison circuit 17 includes 279 D-type flip-flop circuits $F_0$ to $F_{278}$ and the decoder 30. The reference clock Scl is inputted to the clock input terminals of the flip-flop circuits $F_0$ to $F_{278}$ in the parallel manner. The delay signals $Sd_{91}$ to $Sd_{369}$ from the delay circuit 16 are inputted to the corresponding input terminals of the flip-flop circuits $F_0$ to $F_{278}$, respectively. The flip-flop circuits $F_0$ to $F_{278}$ latch the values of the delay signals $Sd_{91}$ to $Sd_{369}$ being inputted at the timing of the reference clock signal Scl, respectively, and outputs the latched signals as the latch signals $Sq_{91}$ to $Sq_{369}$. The decoder 30 monitors all of the latch signals $Sq_{91}$ to $Sq_{369}$ to detect the latch signal which changes to "H" prior to any other latch signals after the timing at which the reference clock signal Scl changes to "H", and outputs the number of the buffer element corresponding to the latch signal thus detected as the offset clock signal Soc. This processing is generally called as "binary coding processing".

The operation of the comparison circuit 17 will be described in more detail with reference to FIG. 7. In FIG. 7, at the first timing when the reference clock Scl becomes "H", the delay signals up to $Sd_{184}$ are "H" and the delay signals after $Sd_{184}$ are "L". Therefore, at this first timing when the reference clock Scl becomes "H", the latch signals up to Sq183 are "H" and the latch signals after $Sq_{184}$ are "L". It is the latch signal $Sq_{184}$ that changes to "H" for the first time after the timing when the reference clock Scl becomes "H". Therefore, at this timing, the signal (shown as "92 (=184−92)") indicative of the buffer element $B_{184}$, which is being inputted to the flip-flop circuit $F_{93}$ corresponding to the latch signal $Sq_{184}$, is outputted as the offset clock signal Soc.

Subsequently, at the second timing when the reference clock signal Scl becomes "H", the delay signals up to $Sd_{185}$ are "H" and the delay signals after $Sd_{185}$ are "L". This change in comparison with the above-mentioned timing first the reference clock signal becomes "H" results from the change of the operation time of the respective buffer elements due to the environmental change. By this, at the second timing when the reference clock signal Scl becomes "H", the latch signals up to $Sq_{184}$ are "H" and the latch signals after $Sq_{185}$ are "L". It is the latch signal $Sq_{185}$ that changes for the first time after the timing when the reference timing signal Scl changes to "H". Therefore, the signal (shown as "93 (=185−92)") indicating the buffer element $B_{185}$, which is being inputted to the flip-flop circuit $F_{94}$ corresponding to the latch signal $Sq_{185}$, is outputted as the offset clock signal Soc. In this operation, the value obtained by subtracting "92" from the number of the subject buffer element is outputted as the offset clock signal Soc, so as to facilitate the design of the decoder 30.

Figure 8:
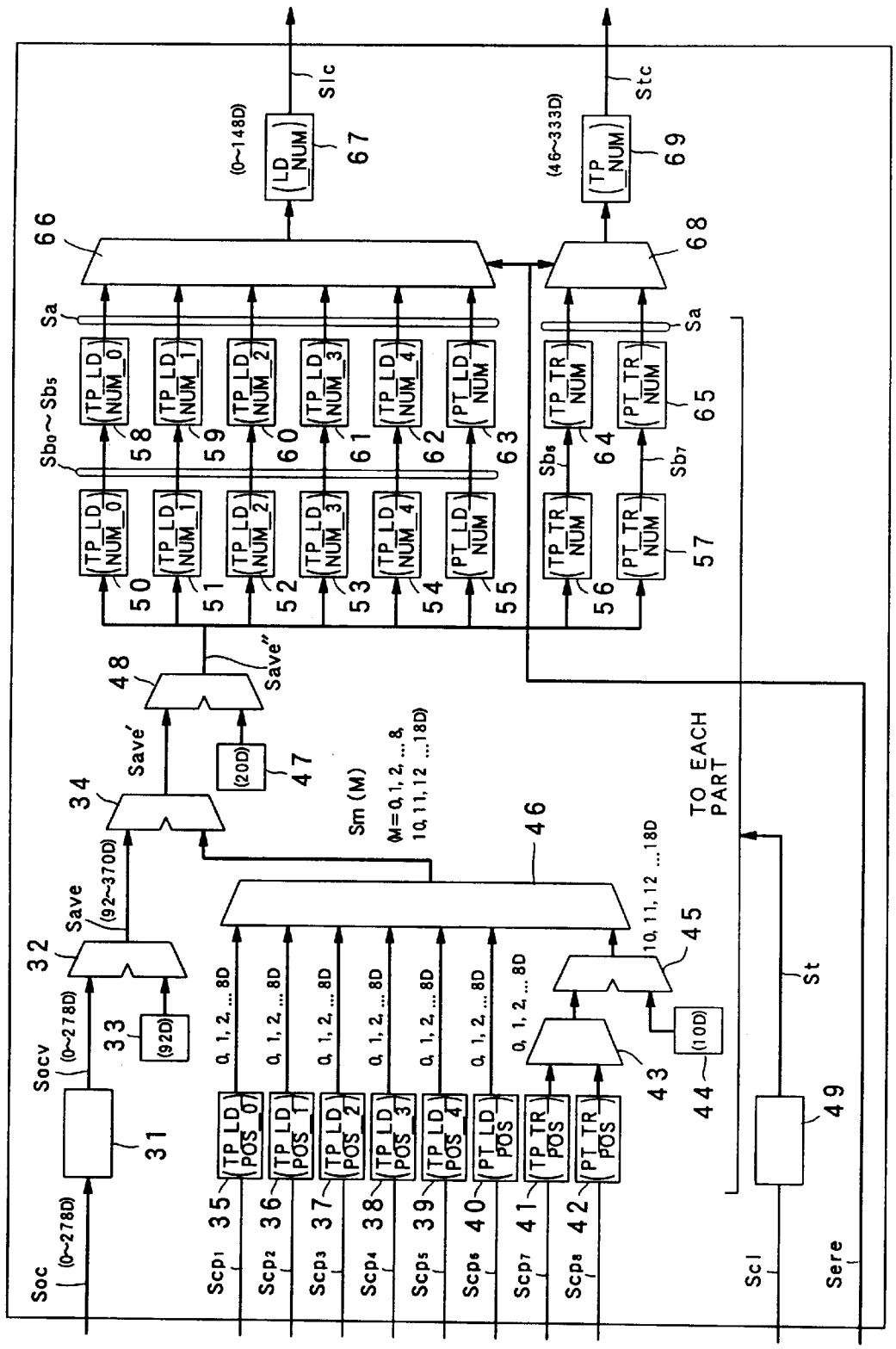
FIG. 8 is a block diagram illustrating the detailed configuration of the arithmetic circuit.
Figure 9:
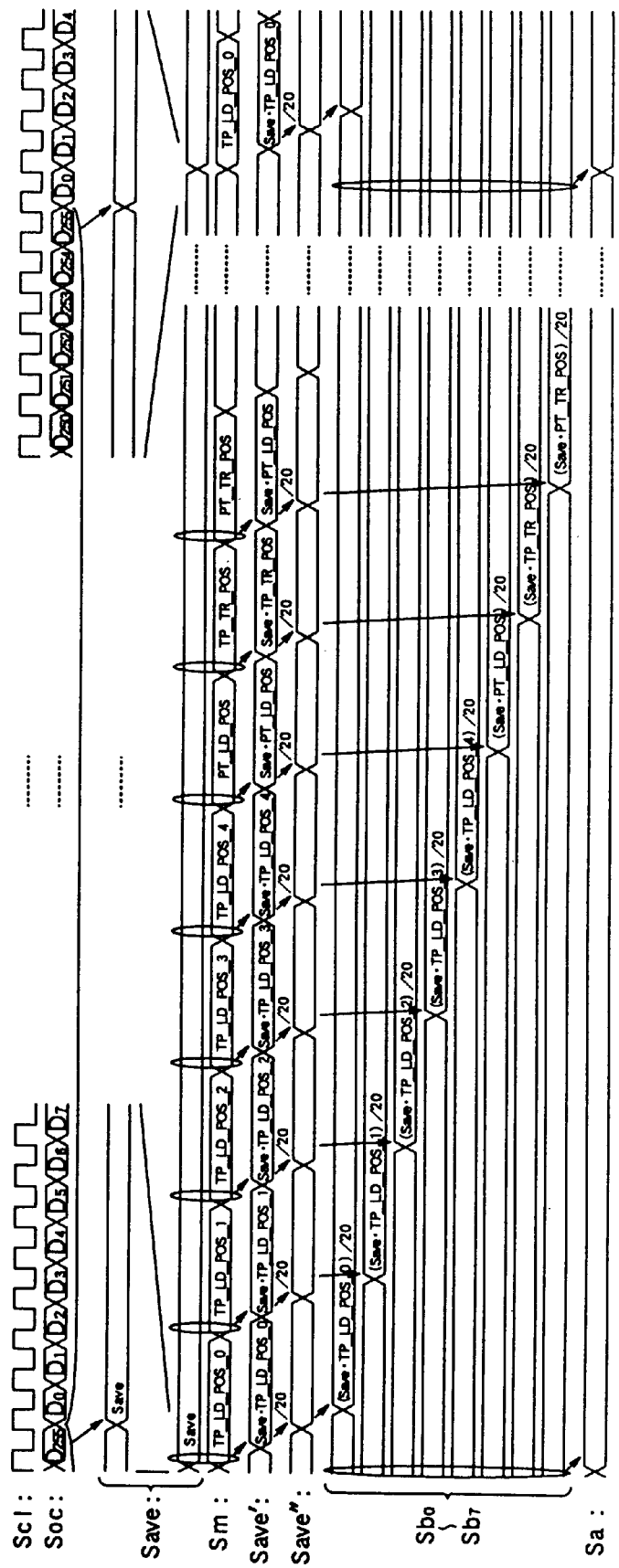
FIG. 9 is a timing chart illustrating the operation of the arithmetic circuit.

Next, the detailed configuration and the operation of the arithmetic circuit 18 will be described with reference to FIGS. 8 and 9. As shown in FIG. 8, the arithmetic circuit 18 includes the averaging unit 31, the adders 32 and 45, the constant value providers 33, 44 and 47, the multiplier 34, the 3-bits timing setting registers 35 to 42, the selectors 43, 46, 66 and 68, the divider 48, the timing generator 49, the division result registers 50 to 57, the arithmetic result registers 58 to 65, the rising timing register 67 and the falling timing register 69.

Next, the detailed operation will be described. The averaging unit 31 receives the offset clock signal Soc from the comparison circuit 17, averages the offset clock signals Soc outputted at the timings of 256 pulses in the reference clock signal Scl, and outputs the average signal Socv (the average of the numbers of the buffer elements included in the 256 offset clock signals Soc) to the adder 32. The adder 32 adds the constant "92" (corresponding to the value "92" which is subtracted by the operation in the comparison circuit 17) to the output from the averaging unit 31 to produce and output the average clock signal Save to the multiplier 34. The average clock signal Save corresponds to the number of the buffer element (i.e., the number of the buffer element corresponding to the delay time which coincides with the period of the reference clock signal Scl under the varying external environment) carrying information of the operation time (i.e., delay amount) varying due to the variation of the external environment.

Each timing setting register 35 to 42 receives the register setting signals $Scp_1$ to $Scp_8$ from the processor 8, respectively. Each register setting signal $Scp_1$ to $Scp_8$ includes the setting value indicating the rising or falling timing of the pulses in the recording signal Sdd, respectively. The rising timing or the falling timing is indicated by the time (set by the value smaller than 0.5T) from the head portion of one period of the reference clock Scl. Specifically, the register setting signals $Spc_1$ to $Spc_5$ are the values indicating the rising timings of the top pulse. 5 different positions are set, in accordance with the mark/space pattern of the modulated signal Sre for the rising timings of the top pulse, and are stored in the timing registers 35 to 39, respectively, as "TP LD POS0" to "TP LD POS4". Similarly, the register setting signal $Scp_6$ is the value indicating the rising timing of each pulse within the pulse train in common, the register setting signal $Scp_7$ is the value indicating the falling timing of the top pulse, and the register setting signal $Scp_8$ is the value indicating the falling timing of each pulse within the pulse train in common. The register setting signals $Spc_1$ to $Spc_8$ are temporarily stored in the corresponding timing setting register 35 to 42, and are read out at the timing represented by the timing signal St, respectively. Out of the register setting signals $Scp_1$ to $Scp_8$, the register setting signals $Scp_1$ to $Scp_6$, indicating the rising timings of the pulses, are outputted to the selector 46 directly. One of the register setting signals $Scp_7$ and $Scp_8$ is selected by the selector 46. The adder 45 adds the constant "10" from the constant provider 44 to the output of the selector 43 and outputs the result to the selector 46. The reason for applying such processing onto the register setting signals $Scp_7$ and $Scp_8$ is as follows. In this embodiment, the register setting signals $Scp_7$ and $Scp_8$ are expressed, similarly to the register setting signals $Scp_1$ to $Scp_6$, by the time from the head portion of the front half period (0.5T) of the reference clock Scl. Therefore, in order to avoid such a malfunction that the rising timing and the falling timing are set by the same value, the constant "10" is added to the register setting signals $Scp_7$ and $Scp_8$ to be of the value within the later half period of 0.5T of the reference clock Scl, thereby distinguishing the falling timing from the rising timing.

Then, the signals inputted to the selector 46 are selected in the order from the timing setting selector 35 to the timing setting selector 42 at the timings of a predetermined period (e.g., the timings of the period of the sum of the time required in the averaging by the averaging unit 31 and the time required in the processing by the divider 48), and are supplied to the multiplier 34 as the constant signal Sm.

Then, the multiplier 34 multiplies the average clock signal Save by the constant signal Sm, and outputs the multiplied signal Save' indicating the position within one period of the reference clock Scl for one of the rising and the falling timings. The divider 48 divides the multiplied signal Save' by the output of the constant provider 47 (constant "20") to produce the divided signal Save". The divided signal Save" is a signal indicating which position of the 20 divisions the rising timing or the falling timing indicated by the register setting signals Scp1 to Scp8 correspond, when the one period of the reference clock signal Scl is divided by 20.

Then, the divided signal Save" is stored in one of the division result registers 50 to 57 which corresponds to the register setting signals $Scp_1$ to $Spc_8$ used for the generation of the divided signal Save". Specifically, the divided signal Save" generated by performing the multiplication and the division using the constant Sm outputted by the selection of the register setting signal $Scp_1$ (indicating the first rising position of the top pulse in the recording signal Sdd and represented by "TP LD NUM0" in FIG. 8) is stored in the division result register 50. The divided signal Save" corresponding to the register setting signal $Scp_2$ (indicating the second rising position of the top pulse in the recording signal Sdd and represented by "TP LD NUM1" in FIG. 8) is stored in the division result register 51. The divided signal Save" corresponding to the register setting signal $Scp_3$ (indicating the third rising position of the top pulse in the recording signal Sdd and represented by "TP LD NUM2" in FIG. 8) is stored in the division result register 52. The divided signal Save" corresponding to the register setting signal $Scp_4$ (indicating the fourth rising position of the top pulse in the recording signal Sdd and represented by "TP LD NUM3" in FIG. 8) is stored in the division result register 53. The divided signal Save" corresponding to the register setting signal $Scp_5$ (indicating the fifth rising position of the top pulse in the recording signal Sdd and represented by "TP LD NUM4" in FIG. 8) is stored in the division result register 54. In addition, the divided signal Save" generated by performing the multiplication and the division using the constant Sm outputted with the selection of the register setting signal $Scp_6$ (indicating the rising positions of the pulse train in the recording signal Sdd and represented by "TP LD NUM" in FIG. 8) is stored in the division result register 55. The divided signal Save" (indicating the falling position of the top pulse in the recording signal Sdd and represented by "TP TR NUM" in FIG. 8) corresponding to the register setting signal $Scp_7$ is stored in the division result register 56. The divided signal Save" corresponding to the register setting signal $Scp_8$ (indicating the falling positions of the pulse train in the recording signal Sdd and represented by "TP TR NUM" in FIG. 8) is stored in the division result register 57.

The divided signals Save" stored in the respective division result registers 50 to 57 are outputted as the register output signals $Sb_0$ to $Sb_7$ at the timings indicated by the timing signal St, and are stored in the operation result registers 58 to 65, respectively. After the timing control in the operation registers 58 to 65, the divided signals Save" are simultaneously outputted by 8 operation result registers 58 to 65, as the register output signals Sa, to the selectors 66 and 68. The selectors 66 and 68 also receive the register selection signal Sere outputted by the signal generating unit 21 in the waveform generation logic unit 15. The register selection signal Sere is used to select the register output signals Sa outputted by the operation result registers 58 to 65 and output it as the rising selection signal Slc or the falling selection signal Stc, so as to output the rising selection signal Slc and the falling selection signal Stc for generating the recording signal Sdd corresponding to the mark/space pattern of the modulated signal detected by the patter detection unit 22. In other words, the register selection signal Sere is used to select the register output signal Sa from the operation result registers 58 to 65 to output it as the rising selection signal Slc or the falling selection signal Stc in order to change the pulse width of the 1.5T mark more precisely when the modulated signal Sre having the 4T mark period is converted into the recording signal Sre having the waveform of: 1.5T space→1.5T mark→0.5T space→0.5T mark. Depending upon the combination of the space period and the mark period, it may be preferred to set the top pulse to be, not simply 1.5T mark, but 1.49T or 1.51T mark (set to 0.5T mark in the case of pulse train). This is why the register setting signals, indicating the rising timing of the top pulse, includes 5 kind of signals $Scp_1$ to $Scp_5$.

Since the register output signals $Sb_0$ to $Sb_5$ for determining the rising timing of the pulse in the recording signal Sdd are stored in one of the operation result registers 58 to 63, the register selection signal Sere for determining the rising timing of the pulse in the recording signal Sdd is inputted to the selector 66 to select one of the register output signals Sa from the operation result registers 58 to 63. On the other hand, since the register output signals $Sb_6$ or $Sb_7$ for determining the falling timing of the pulse in the recording signal Sdd is stored in the operation result register 64 or 65, the register selection signal Sere for determining the falling timing of the pulse in the recording signal Sdd is inputted to the selector 68 to select one of the register output signals Sa from the operation result registers 64 and 65.

Finally, the rising selection signal Slc outputted by the selector 66 is outputted to the rising timing selector 20 via the rising timing register 67 as the output signal of the arithmetic circuit 18. At the same time, the falling selection signal Stc outputted by the selector 68 is supplied to the falling timing selector 19 via the falling timing register 69. In the above described operation of the arithmetic circuit 18, the timing signal St for establishing the synchronization of the components is generated by the timing generator 49 based on the reference clock Scl and is supplied to those components.

The operation of the arithmetic circuit 18 will be further described with reference to FIG. 9. In FIG. 9, the offset clock signal Soc, which is inputted every one period of the reference clock Scl, is averaged at every 256 periods and outputted to the multiplier 34 as the average clock signal Save. The selector 46 successively selects the signals from the timing setting registers 35 to 42 in the time-division manner and outputs them to the multiplier 34 as the constant signal Sm. The multiplier 34 generates the multiplication signal Save', and the multiplication signals Save' corresponding to the register setting signals $Scp_1$ to $Scp_8$ are successively supplied to the divider 48. The divider 48 generates the division signals Save" to be stored in the division result registers 50 to 57. Then, the division result registers 50 to 57 output the register output signals $Sb_0$ to $Sb_7$ in the time-division manner, and finally the operation result registers 58 to 65 output the register output signals Sa to the selectors 66 and 68.

Here, the relationship between the register selection signal Sere and the enable signal Sle or Ste generated by the waveform generation logic unit 15 will be described in more detail. The register selection signal Sere is a signal for subdividing and controlling the pulse width of the recording signal Sdd from 1.5T or 0.5T. The enable signal Sle or Ste is used to select and extract the pulse to be outputted as the set signal Srs or the reset signal Srr, in order to actually indicate the rising timing or the falling timing in the recording signal Sdd, from the pulses included in the rising timing signal Sld or the falling timing signal Str (including one pulse in 1T period, respectively) which is selected and outputted by the rising selection signal Slc or the falling selection signal Stc generated based on the register selection signal Sere for such a subdivision.

Figure 10:
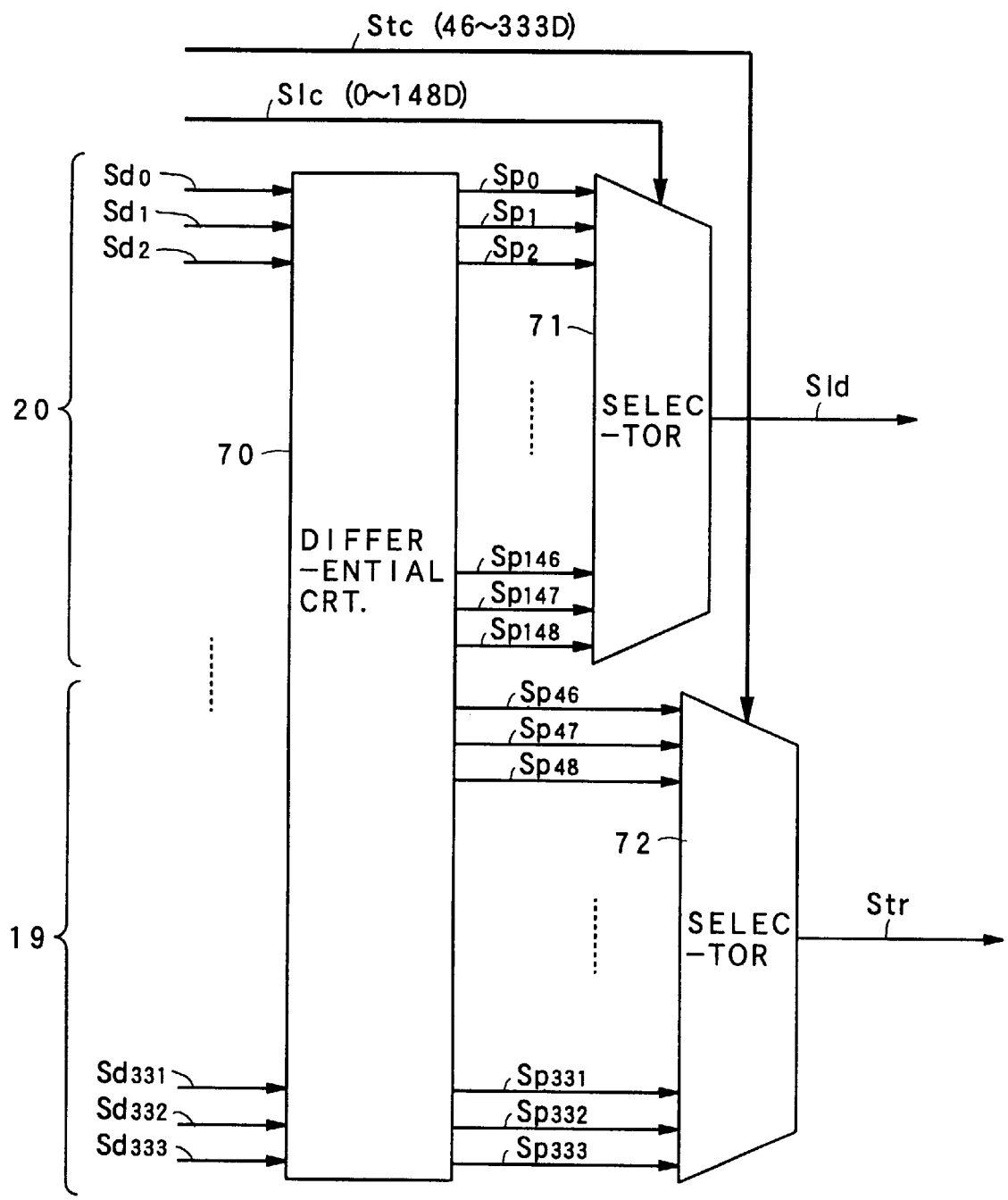
FIG. 10 is a block diagram illustrating the detailed configuration of the selectors.

Next, the detailed configuration and the operation of the rising timing selector 20 and the falling timing selector 19 will be described with reference to FIG. 10. In FIG. 10, the rising timing selector 20 and the falling timing selector 19 include the differential circuit 70 used in common, the selector 71 for outputting the rising timing signal Sld, and the selector 72 for outputting the falling timing signal Str. With this arrangement, the differential circuit 70 receives the delay signals $Sd_0$ to $Sd_{333}$ from the delay circuit 16 in the parallel manner to differentiate those signals individually, and outputs the differentiated signals as the differential signals $Sp_0$ to $Sp_{333}$. The selector 71 receives the differential signals $Sp_0$ to $Sp_{148}$ (which are possibly used as the rising timings of the pulses in the recording signals Sdd) out of the output signals of the differential circuit 70, and outputs one of the differential signals as the rising timing signal Sld on the basis of the rising selection signal Slc from the arithmetic circuit 18. The selector 72 receives the differential signals $Sp_{46}$ to $Sp_{333}$ (which are possibly used as the falling timings of the pulses in the recording signals Sdd) out of the output signals of the differential circuit 70, and outputs one of the differential signals as the falling timing signal Str on the basis of the falling selection signal Stc from the arithmetic circuit 18. In the above operation, the differential signals $Sp_{46}$ to $Sp_{148}$ are outputted to both of the selectors 71 and 72.

Next, the operation of the waveform generation logic unit 15 will be described with reference to FIGS. 4 and 11. First, the pattern detector 22 in the signal generator 21 detects the mark/space pattern of the inputted modulated signal Sre, and outputs the delayed modulated signal Sred obtained by delaying the modulated signal Sre for a given time period to the pulse output timing generator 23. This given time period is determined in consideration of the operation times of the comparison circuit 17 and the arithmetic circuit 18. The pulse output timing generator 23 refers to the delayed modulated signal Sred thus inputted and the rising and falling timings of the pulses in the recording signal Sdd, which correspond to the mark/space pattern of the delayed modulated signal Sred stored beforehand in the pulse output timing generator 23, and outputs the rising enable signal Sle and the falling enable signal Ste.

Here, the description will be given of the rising or falling timing of the pulses in the recording signal Sdd stored beforehand in the pulse output timing generator 23. In the respective mark periods of the delayed modulated signal Sred, the pulse is deleted for the initial 1.5T period, the pulse is maintained to be "H" for the next 1.5T period, and the pulse are deleted for only 0.5T periods for the following respective reference clock periods. Further, the rising timing of the top pulse is subdivided corresponding to the mark/space pattern of the modulated signal Sre. Specifically, for example, the rising or falling timings (deletion rate of the waveform) of the respective pulses corresponding to the modulated signal Sre of the 4T marks period for one reference clock period is:

|100%|50%|0%|50%| and the deletion rate of the waveform corresponding to the delayed modulated signal Sre of the 8T mark period for one clock period is:

|100%|50%|0%|50%|50%|50%|50%|50%|.

Figure 11:
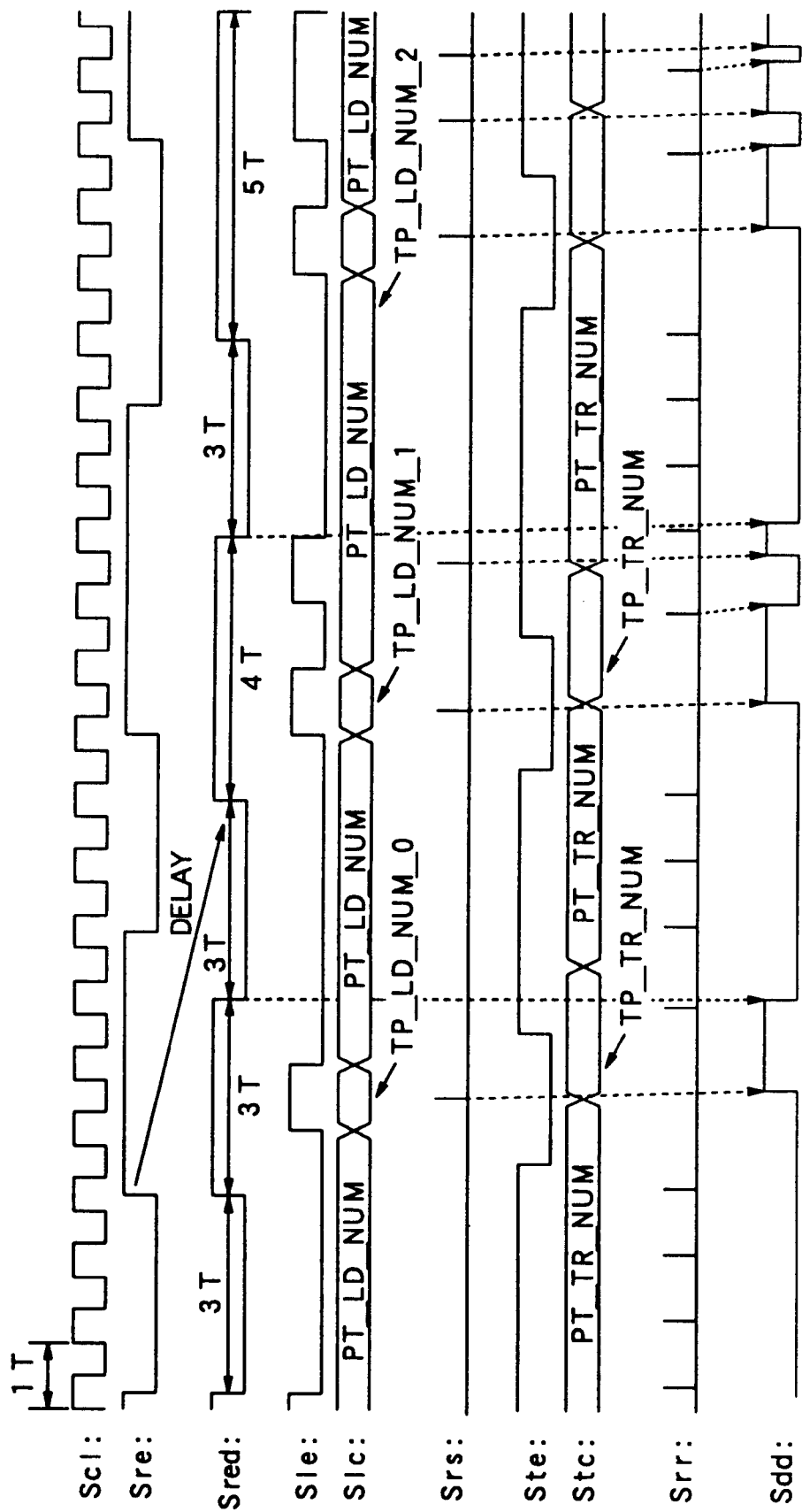
FIG. 11 is a timing chart illustrating the operation of the waveform generation logic unit.

On the other hand, the arithmetic circuit 18 outputs the rising selection signal Slc and the falling selection signal Stc, having the timing and signal contents shown in FIG. 11, which are used in the selection in the rising timing selector 20 and the falling timing selector 19. The AND circuit 24 outputs the set signal Srs, which is the product of the rising enable signal Sle and the rising timing signal Sld, to the set input terminal of the flip-flop circuit 26. The AND circuit 25 outputs the reset signal Srr, which is the product of the falling enable signal Ste and the falling timing signal Str, to the reset terminal of the flip-flop circuit 26. The flip-flop circuit 26 is controlled, by the set signal Sre and the reset signal Srr, to output the recording signal Sdd. In the example shown in FIG. 11, the waveform of the recording signal Sdd is determined in accordance with the mark/space pattern of the delayed modulated signal Sred (3T space→3T mark→3T space→4T mark→3T space→5T mark).

The values of the falling selection signal Stc and the rising selection signal Slc specifically described in FIG. 5 will be described in connection with the falling selection signal Stc and the rising selection signal Slc. The value "28" of the rising selection signal Slc indicated by "TP LD NUM 1" in FIG. 5B is the selection signal indicating that the delay signal $Sd_{28}$ should be selected as the rising timing signal Sld representing the rising of the top pulse. This value is calculated as follows:

$$185/20 \times 3 \approx 28,$$

when the average clock signal Save is "185" (namely, the delay times of the respective buffer elements $B_0$ to $B_{369}$ are 0.2 nsec) and the rising timing of the top pulse indicated by the register setting signal $Scp_2$ (namely, the timing indicated by "TP LD POS1") is at the third timing from the start of the period of the reference clock signal Scl.

The value "37" of the rising selection signal Slc indicated by "TP LD NUM" in FIG. 5B is the selection signal indicating that the delay signal $Sd_{37}$ should be selected as the rising timing signal Sld representing the risings of the pulses in the pulse train. This value is calculated as follows:

$$185/20 \times 4 \approx 37,$$

when the average clock signal Save is "185" and the rising timings of the pulses in the pulse train indicated by the register setting signal $Scp_6$ (namely, the timing indicated by "TP LD POS") is at the fourth timing from the start of the period of the reference clock signal Scl.

The value "139" of the falling selection signal Stc indicated by "TP TR NUM" in FIG. 5C is the selection signal indicating that the delay signal $Sd_{139}$ should be selected as the falling timing signal Str representing the falling of the top pulse. This value is calculated as follows:

$$185/20 \times (5+10) \approx 139,$$

when the average clock signal Save is "185" and the falling timing of the top pulse indicated by the register setting signal $Scp_7$ (namely, the timing indicated by "TP TR POS") is at the fifth timing from the start of the period of the reference clock signal Scl.

Finally, the value "130" of the falling selection signal Stc indicated by "TP TR NUM" in FIG. 5C is the selection signal indicating that the delay signal $Sd_{130}$ should be selected as the falling timing signal Str representing the failings of the pulses in the pulse train. This value is calculated as follows:

$$185/20 \times (4+10) \approx 130,$$

when the average clock signal Save is "185" and the falling timings of pulses in the pulse train indicated by the register setting signal $Scp_8$ (namely, the timing indicated by "TP TR POS") is at the fourth timing from the start of the period of the reference clock signal Scl.

As described above, according to the operation of the information recording apparatus S including the pattern control circuit 11 of the first embodiment, the delay signals corresponding to the timing when the recording signal Sdd corresponding to the pulse waveform of the modulated signal Sre is produced are selected from the delayed signals $Sd_0$ to $Sd_{333}$, and the recording signal Sdd corresponding to the recognized pulse waveform is produced based on the selected signals. Therefore, the modulated signal can be converted to the desired recording signal Sdd with high accuracy and reproducibility. In addition, the delay circuit 16 has the arrangement of the serial connection of the buffer elements $B_0$ to $B_{369}$, each having the delay time shorter than the period of the reference clock signal Scl, and the rising timing signal Sld and the falling timing signal Str are generated based on the delay signals $Sd_0$ to $Sd_{333}$ from the buffer elements $B_0$ to $B_{369}$. Therefore, the rising timing signal Sld and the falling timing signal Str can be generated with simple configuration.

Further, since the comparison circuit 17 and the arithmetic circuit 18 compensate for the variation of the delay time in the buffer elements $B_0$ to $B_{369}$, the recording signal Sdd can be generated with high accuracy. Still further, since the recording signal Sdd is recorded on the DVD-R 1, the digital information Sr can be recorded with the formation of accurately-shaped recording pits corresponding to the digital information Sr.

(iii) Second Embodiment of the Power Control Circuit

Next, the second embodiment will be described with reference to FIGS. 12 to 15. In the first embodiment described above, the rising timing signal Sld and the falling timing signal Str are outputted by the selection from the delay signals $Sd_0$ to $Sd_{369}$ from the buffer elements $B_0$ to $B_{369}$. In the second embodiment, a plurality of selectors are connected in serial manner, and the rising timing signal Sld and the falling timing signal Str are generated by controlling the operation in the respective selectors.

Figure 12:
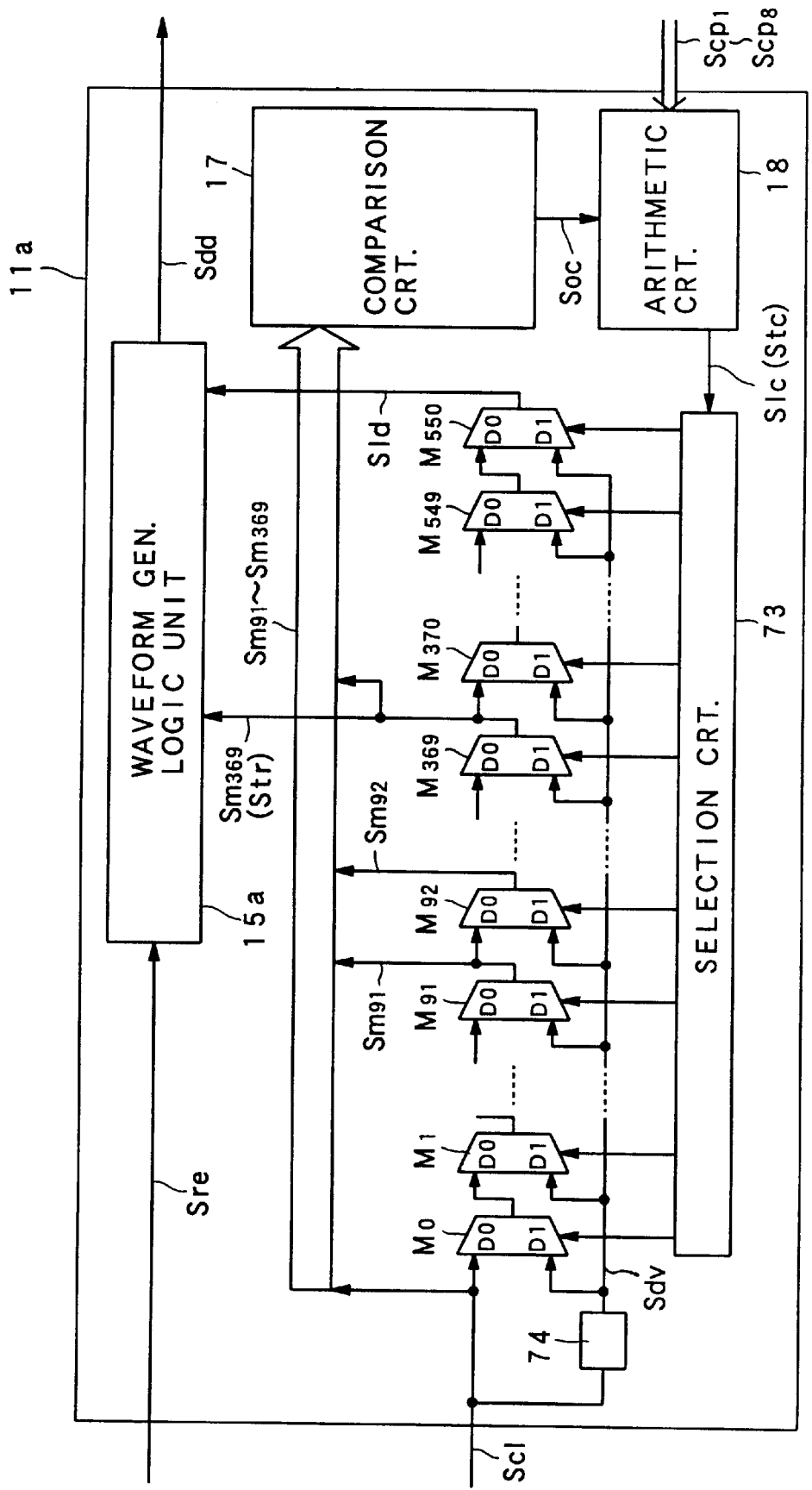
FIG. 12 is a block diagram illustrating the schematic configuration of the power control circuit according to the second embodiment of the present invention.
Figure 13A:
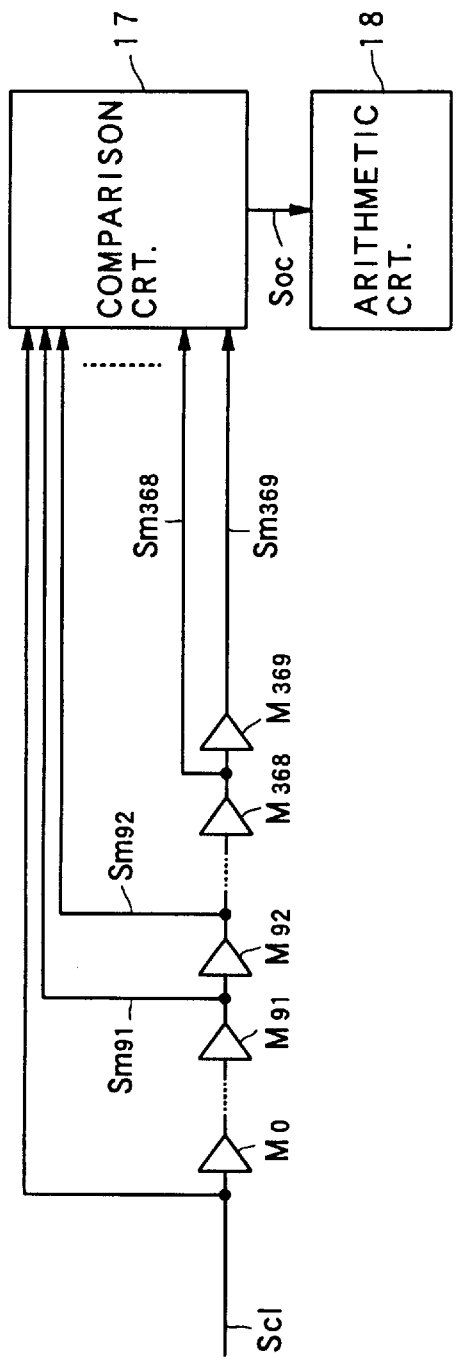
FIGS. 13A and 13B are block diagrams illustrating the equivalent circuits of the power control circuit shown in FIG. 12.
Figure 13B:
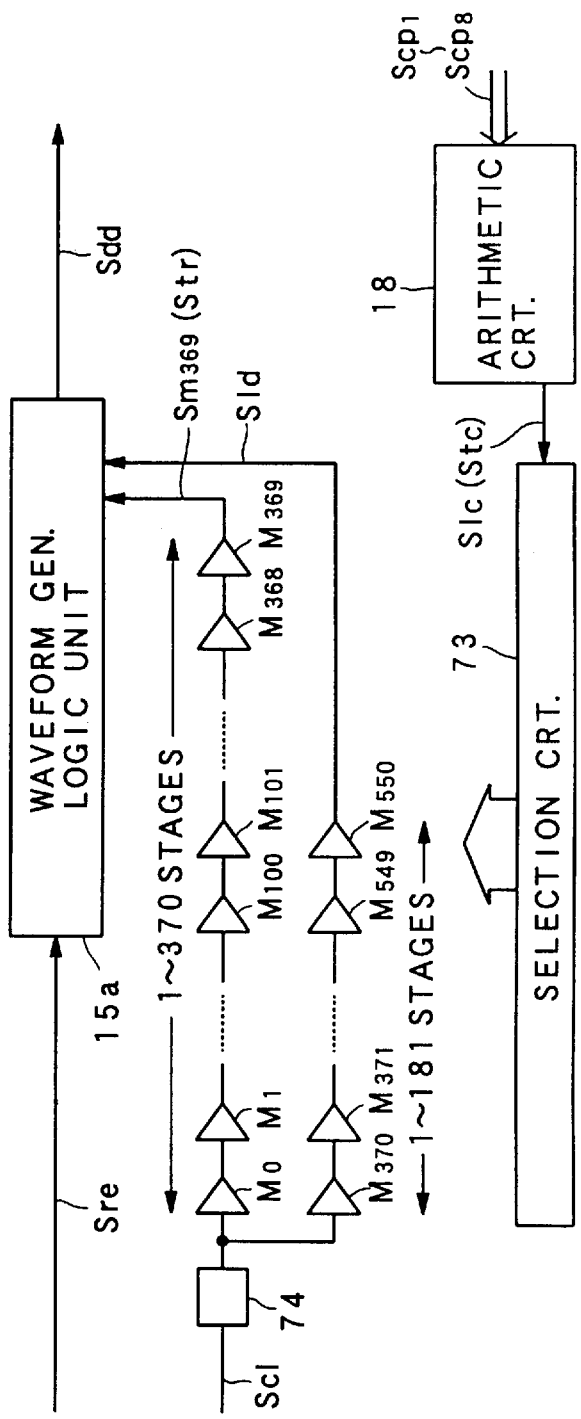

First, the principle of the power control circuit 11a will be described with reference to FIGS. 12, 13A and 13B. FIG. 12 is a block diagram showing the outline of the power control circuit 10a, and FIGS. 13A and 13B are diagrams showing the equivalent circuits of the power control circuit 11a shown in FIG. 12.

As shown in FIG. 12, the power control circuit 11a according to the second embodiment includes the waveform generation logic unit 15a, the comparison circuit 17, the arithmetic circuit 18, the double-input selectors $M_0$ to $M_{550}$, the selection circuit 73 and the differentiation circuit 74. Each of the selectors $M_0$ to $M_{550}$ has the operation time (namely, the time period from signal input to the selected signal output) which varies dependently upon the external environment such as the temperature, similarly to the buffer elements $B_0$ to $B_{369}$ in the first embodiment. The comparison circuit 17 and the arithmetic circuit 18 are the same as those in the first embodiment.

Next, the operation will be described. The differentiation circuit 74 differentiates the reference clock signal Scl to produce the differential signal Sdv indicating the rising position thereof, and outputs them to the terminals (D1 terminals) of the selectors $M_0$ to $M_{550}$ in the parallel fashion. The selectors $M_0$ to $M_{550}$ are connected in serial manner so that the output of one selector is supplied to the terminal D0 of the selector of the following stage. The first selector $M_0$ receives directly the reference clock signal Scl at its D0 terminal. The selectors $M_{91}$ to $M_{369}$ supply their outputs to the comparison circuit 17 in the parallel fashion. The comparison circuit 17 produces the offset clock signal Soc indicating the number of the selectors, the sum of the operation times of which corresponds to one period of the reference clock signal Scl (i.e., how many stages of selectors the one period corresponds), like the first embodiment. The selectors $M_0$ to $M_{550}$ selected by the selection circuit 73 output the differential signals Sdv inputted to their D1 terminals as the selector signals after the operation time has passed, and the selectors $M_0$ to $M_{550}$ not selected by the selection circuit 73 output the signals inputted to their D0 terminals as the selector signal after the operation time has passed. The selection circuit 73 selects one of the selectors, based on the rising selection signal Slc and the falling selection signal Stc from the arithmetic circuit 18, to allow that selected selector to output its input signal to the D1 terminal as the selector signal. The selectors $M_0$ to $M_{550}$ are classified into the selectors for setting the rising timings (selectors $M_{370}$ to $M_{550}$) and the selectors for setting the falling timings (selectors $M_0$ to $M_{369}$). Only one of the selectors for setting the rising timing outputs the input signal to its D1 terminal as the selector signal, and all other selectors output the input signal to their D0 terminals as the selector signals. The selector signal $Sm_{550}$ from the selector $M_{550}$ is supplied to the waveform generation logic unit 15a as the rising timing signal Sld. Similarly, only one of the selectors for setting the falling timing outputs its input signal to the D1 terminal as the selector signal, and all other selectors output the input signal to their D0 terminals as the selector signals. The selector signal $Sm_{369}$ from the selector $M_{369}$ is supplied to the waveform generation logic unit 15a as the falling timing signal Str.

Next, the above operation will be described in more detail with reference to FIGS. 13A and 13B. First, the description will be given of the generation of the offset clock signal Soc using the selector signals $Sm_9$ to $Sm_{369}$ from the selectors $M_{91}$ to $M_{369}$ and the comparison circuit 17 with reference to FIG. 13A. In the power control circuit 11a, the generation of the offset clock signal Soc is performed during the space period of the modulated signal Sre, and in that period all of the selectors $M_{91}$ to $M_{369}$ output the input signals to their D0 terminals as the selector signals. As shown in FIG. 13A, the equivalent circuit relating to the generation of the offset clock signal Soc includes the serial connection of the selectors $M_0$ to $M_{369}$, and selector signals $Sm_{91}$ to $Sm_{369}$ from the selectors $M_{91}$ to $M_{369}$ are individually supplied to the flip-flop circuits $F_0$ to $F_{278}$ in the comparison circuit 17 in the parallel manner. The comparison circuit 17 generates the offset clock signal Soc from the selector signals $Sm_{91}$ to $Sm_{369}$ and the reference clock signal Scl in the same manner as the first embodiment.

Next, the generation of the falling timing signal Str and the rising timing signal Sld using the selectors $M_0$ to $M_{550}$ and the arithmetic circuit 18 will be described with reference to the equivalent circuit shown in FIG. 13B. The power control circuit 11a generates the falling timing signal Str and the rising timing signal Sld in the mark period of the modulated signal Sre. In the equivalent circuit relating to the generation of the falling timing signal Str, as shown in FIG. 13B, the differential signal Sdv, obtained by differentiating the reference clock signal Scl in the differentiation circuit 74, is passed to all of the selectors $M_0$ to $M_{369}$ following the one selector selected by the selection circuit 73 to output the falling timing signal Str. In the equivalent circuit relating to the generation of the rising timing signal Sld, as shown in FIG. 13B, the differential signal Sdv is passed to all of the selectors $M_{370}$ to $M_{550}$ following the one selector selected by the selection circuit 73 to output the rising timing signal Str. In these operations, the selection circuit 73 selects one of the selectors on the basis of the rising selection signal Slc and the falling selection signal Stc from the arithmetic circuit 18.

Figure 14:
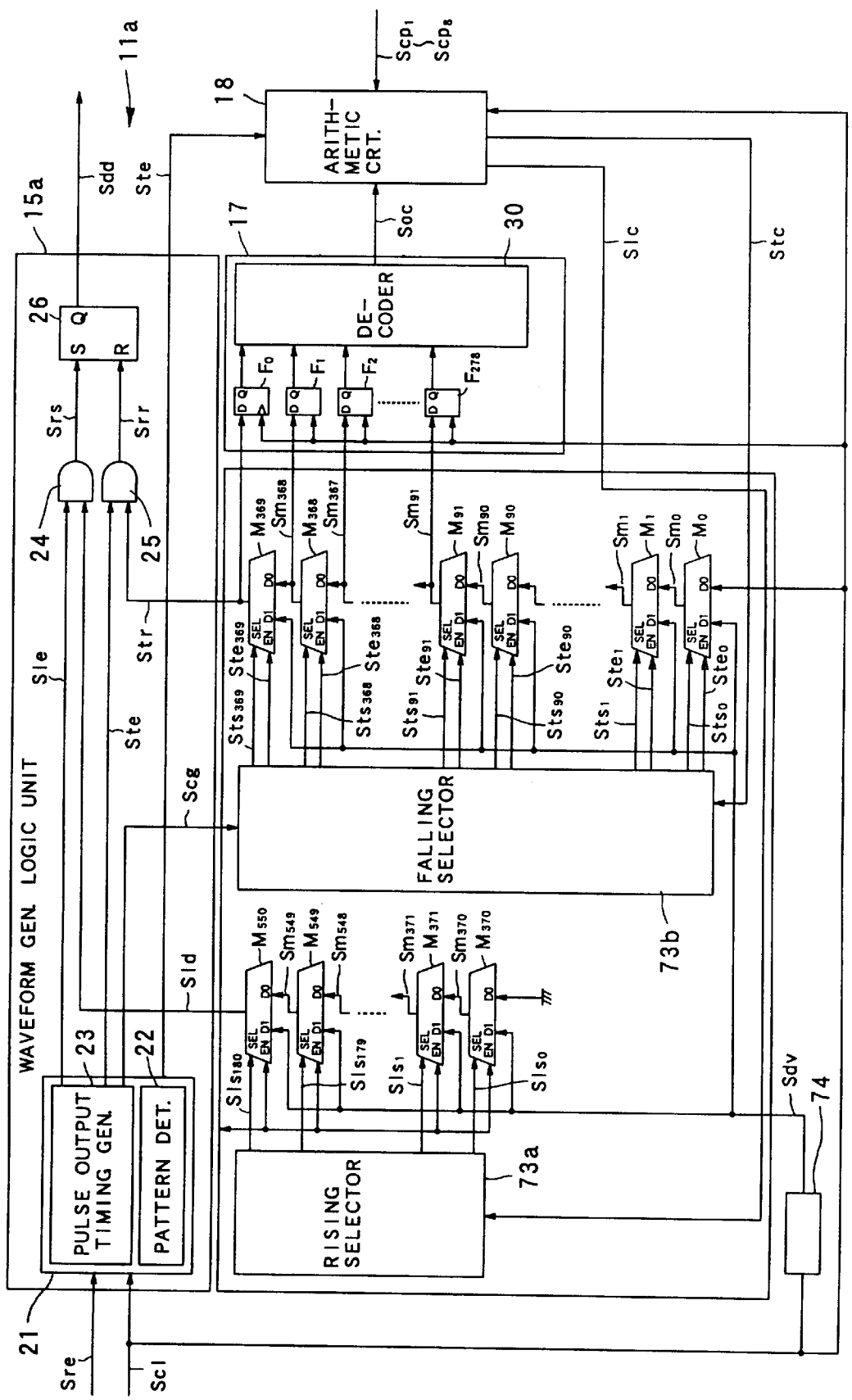
FIG. 14 is a block diagram illustrating the detailed configuration of the power control circuit according to the second embodiment of the invention.

Next, the circuit configuration and the operation of the power control circuit 11a will be described with reference to FIGS. 14 and 15. As shown in FIG. 14, the power control circuit 11a includes the waveform generation logic unit 15a, the comparison circuit 17, the arithmetic circuit 18, the serially-connected selectors $M_0$ to $M_{369}$, the serially-connected selectors $M_{370}$ to $M_{550}$, the rising selector 73a and the falling selector 73b corresponding to the above-mentioned selection circuit 73, and the differentiation circuit 74. With this arrangement, each selector has the control terminal (SEL terminal) and the enable terminal (EN terminal) in addition to the D0 and D1 terminals. The control terminal receives the control signals $Sls_0$ to $Sls_{180}$ from the rising selector 73a or the control signals $Sts_0$ to $Sts_{369}$ from the falling selector 73b, and the enable terminal receives the enable signal to reset the respective selectors. The selectors $M_{370}$ to $M_{550}$ receive, at their control terminals, the control signals $SlS_0$ to $SlS_{180}$ from the rising selector 73a. The enable terminals of the selectors $M_{370}$ to $M_{550}$ are connected to the power supply, and the D0 terminal of the selector $M_{370}$ is grounded. The selectors $M_{370}$ to $M_{550}$ do not receive the reference clock signal Scl. The selectors $M_0$ to $M_{369}$ receive, at their control terminals, the control signals $StS_0$ to $StS_{369}$ from the falling selector 73b. The enable terminals of the selectors $M_0$ to $M_{369}$ receive the enable signals $Ste_0$ to $Ste_{369}$ from the falling selector 73b. In the operation described below, the selectors $M_{370}$ to $M_{550}$ need no enable terminal. However, the selectors $M_{370}$ to $M_{550}$ are configured by the same selectors as the selectors $M_0$ to $M_{369}$ and then the enable terminals of the selectors $M_{370}$ to $M_{550}$ are connected to the power supply, in order that the same selectors can be used for all selectors included in the power control circuit 11a to set the delay times of the selectors uniform and to facilitate the manufacturing of the power control circuit 11a.

Comparing the waveform generation logic unit 15a with the waveform generation logic circuit 15 in the first embodiment, only the following configuration is different. Namely, in order to use the selectors $M_0$ to $M_{369}$ in common for the generation of both the offset clock signal Soc and the falling timing signal Str, the pulse output timing generator 23 outputs the switching signal Scg indicating the switching timings to the falling selector 73b.

Next, the specific operation will be described with reference to FIGS. 14 and 15. It is noted that the timing chart shown in FIG. 15 represents the case in which the modulated signal Sre having the pattern of 3T space/4T mark is inputted.

First, the generation of the offset clock signal Soc will be described. This operation is performed in the space period (3T) of the modulated signal Sre. In the offset clock generating period, the selectors $M_{370}$ to $M_{550}$ do not work. The falling selector 73b controls the selectors $M_0$ to $M_{369}$ to output the respective inputs to their D0 terminals as the selector signals $Sm_0$ to $Sm_{369}$. The reference clock signal Scl inputted to the D0 terminal of the selector $M_0$ is delayed, by the operation times of the selectors, every time when it passes through the respective selectors, and the selector signals of the selectors $M_{91}$ to $M_{369}$ are supplied to the comparison circuit 17, respectively. This operation is shown in FIG. 15 as the selector signals $Sm_0$, $Sm_1$, $Sm_2$, $Sm_{183}$ or $Sm_{184}$, for example. In this case, at the timing when the reference clock signal Scl becomes "H", the selector signals up to Sm183 are "H" and the selector signals after $Sm_{184}$ are "L". By this, at this timing, the signal indicating the selector $M_{184}$ ("92"(=184−92)), being inputted to the flip-flop circuit $F_{93}$, is outputted as the offset clock signal Soc.

When the space period in the modulated signal Sre ends, the falling selector 73b outputs the enable signals $Ste_0$ to $Ste_{369}$, in response to the switching signal Scg from the pulse output timing generator 23, to the selectors $M_0$ to $M_{369}$ to reset them, so that all of the reference clock signals Scl (selector signals Sm) are reset. For this operation, FIG. 15 shows the situation in which the reference clock signal Scl (selector signal Sm) is reset at the timing indicated by the mark "*".

When the mark period of the modulated signal Sre starts, the rising selector 73a and the falling selector 73b operate to allow all the selectors $M_0$ to $M_{550}$ to output their inputs to the D0 terminals as the selector signals $Sm_0$ to $Sm_{550}$. Subsequently, the rising selection signal Slc and the falling selection signal Stc, generated by the arithmetic circuit 18 based on the offset clock signal Soc, are separately supplied to the rising selector 73a and the falling selector 73b. Then, only the selectors specified by the rising selection signal Slc and the falling selection signal Stc output the input signals to their D0 terminals as the selector signals.

This operation will be described in more detail with reference to FIG. 15. FIG. 15 shows the condition in which the rising selection signal Slc (see. "PT LD NUM;37" in FIG. 15) having the value "37" is inputted, and the selector $M_{514}$, following the selector $M_{513}$ (513=550−37), outputs the differential signal Sdv inputted to its D0 terminal as the selector signal $Sm_{514}$, so that the signal obtained by delaying the differential signal Sdv for the delay amount of 37 stages of selectors is set to the rising timing signal Sld. The selector signal $Sm_{514}$ is delayed for the delay amount of 37 stages of the selectors and then supplied to the AND circuit 24 as the rising timing signal Sld. Thereafter, the product signal of the rising timing signal Sld and the rising enable signal Sle is calculated and supplied to the flip-flop circuit 26 as the set signal Srs.

FIG. 15 shows the condition in which the falling selection signal Stc (see. "PT TR NUM;130" in FIG. 15) having the value "130" is inputted, and the selector $M_{240}$, following the selector $M_{239}$ (239=369−130), outputs the differential signal Sdv inputted to its D1 terminal as the selector signal $Sm_{240}$, so that the signal obtained by delaying the differential signal Sdv for the delay amount of 130 stages of selectors is set to the falling timing signal Str. The selector signal $Sm_{240}$ is delayed for the delay amount of 130 stages of the selectors and then supplied to the AND circuit 25 as the falling timing signal Str. Thereafter, the product signal of the falling timing signal Str and the falling enable signal Ste is calculated and supplied to the flip-flop circuit 26 as the reset signal Srr.

After that, the flip-flop circuit 26 outputs the recording signal Sdd corresponding to the set signal Sre and the reset signal Srr. In the example shown in FIG. 15, the waveform of the recording signal Sdd is determined in correspondence with the mark/space pattern (3T space/4T mark) of the modulated signal.

As described above, according to the power control circuit 11a of the second embodiment, the digital information Sr can be converted to the desired recording signal Sdd with high accuracy and reproducibility. Further, in this embodiment, the selector signal of one of the selectors which have the delay time shorter than the period of the differential signal and delays the differential signal for the delay time is set to the rising timing signal Sld, and the selector signal of one of the selectors is set to the falling timing signal Str. Hence, the rising timing signal Sld and the falling timing signal Str can be generated with simple configuration. Further, since the comparison circuit 17 and the arithmetic circuit 18 compensate for the variation of the delay time of the selectors $M_0$ to $M_{550}$, the recording signal Sdd can be generated accurately. Still further, since the recording signal Sdd thus generated is recorded on the DVD-R 1, the digital information Sr can be recorded with the formation of accurately-shaped recording pits corresponding to the digital information Sr.

In the above embodiments both of the rising and the falling timing of the recording signal are controlled. In the case of the storage medium, such as CD-R, which does not require as high accuracy as DVD-R, it is possible to control only the rising timing by the method described above and to control the falling timing by adjusting the time constant with the mono-multivibrator.

What is claimed is:

1. A signal converting device (11) for converting a digital signal (Sre) into a recording signal (Sdd) to be recorded on a storage medium (1), comprising:
   a waveform recognition unit (21) for recognizing pulse waveforms of plural kinds in the digital signal (Sre) and outputting waveform pattern signals (Sle, Ste) indicating the pulse waveforms recognized;
   a timing candidate signal generation unit (16) for generating timing candidate signals (Sd) on the basis of a reference clock signal (Scl) having a period equal to a reference period (T) of the digital signal (Sre);
   a timing signal producing unit (18, 19, 20) for selecting the timing candidate signal based on signals ($Scp_1$= $Scp_8$) indicative of pulse transition timings in the recording signal to produce the timing signals (Sld, Str) indicative of at least one of a rising and a falling timing of the recording signal (Sdd); and
   a generation unit (24, 25, 26) for generating the recording signal (Sdd) corresponding to the pulse waveform recognized by the waveform recognition unit (21) on the basis of the timing signal (Sld, Str) and the waveform pattern signals (Sle, Ste).

2. A signal converting device according to claim 1, wherein said timing candidate signal generation unit generates rising timing candidate signals which are candidates of a signal indicative of the rising timing of the recording signal and a falling timing candidate signals which are candidates of a signal indicative of the falling timing of the recording signal, and said timing signal selection unit comprises:
   a rising timing signal selection unit for selecting the rising timing candidate signal corresponding to the rising timing as the rising timing signal on the basis of the waveform of the recording signal corresponding to the pulse waveform recognized by the waveform recognition unit, and
   a falling timing signal selection unit for selecting the falling timing candidate signal corresponding to the falling timing as the falling timing signal on the basis of the waveform of the recording signal corresponding to the pulse waveform recognized by the waveform recognition unit.

3. A signal converting device according to claim 2, wherein said timing candidate signal generation unit comprises a delay unit comprising a plurality of serially-connected delay elements each having a delay time shorter than the period of the reference clock signal, and outputs the output signals of the delay elements as the rising timing candidate signal and the falling timing candidate signal.

4. A signal converting device according to claim 3, further comprising a detection unit for comparing the plurality of the rising timing candidate signals and the plurality of the falling timing candidate signals with the reference clock signal in a time axis basis and for detecting variations of the delay times of the delay elements to output a variation detection signal, wherein said rising timing signal selection unit selects the rising timing signal on the basis of the recording signal waveform and the variation detection signal, and said falling timing signal selection unit selects the falling timing signal on the basis of the recording signal waveform and the variation detection signal.

5. A signal converting device according to claim 3, wherein said delay elements comprise buffer elements.

6. A signal converting device according to claim 2, further comprising a differentiation unit for differentiating the reference clock signal to produce a reference rising timing signal indicative of the rising timing of the reference clock signal, wherein said timing candidate signal generation unit comprises a delay unit comprising a plurality of serially connected delay elements each having a delay time shorter than the period of the reference rising timing signal and delaying the reference rising timing signal for the delay time, said rising timing signal selection unit outputs one of the output signals of the delay elements as the rising timing signal, and said falling timing signal selection unit outputs one of the output signals of the delay elements as the falling timing signal.

7. A signal converting device according to claim 2, further comprising:
   a first delay unit comprising a plurality of serially connected first delay elements each having a delay time shorter than the period of the reference clock signal;
   a detection unit for comparing the respective output signals of the first delay elements with the reference clock signal in the time axis basis and detecting variations of the delay times of the first delay elements to output the variation detection signal;
   a differentiation unit for differentiating the reference clock signal to produce a reference rising timing signal indicative of the rising timing of the reference clock signal, wherein said timing candidate signal generation unit comprises a second delay unit comprising a plurality of serially connected second delay elements of the same type as the first delay elements each having a delay time shorter than the period of the reference rising timing signal and for delaying the reference rising timing signal for the delay time, said rising timing signal selection unit outputs one of the output signals of the second delay elements as the rising timing signal on the basis of the recording signal waveform and the variation detection signal, and said falling timing signal selection unit outputs one of the output signals of the second delay elements as the falling timing signal on the basis of the recording signal waveform and the variation detection signal.

8. A signal converting device according to claim 7, wherein the first delay elements and the second delay elements comprise selection elements for selecting one of the output signal of the first or second delay elements of one stage prior thereto in the serial connection and the reference rising timing signal, said rising timing signal selection unit controls the selection by the one selection elements corresponding to the second delay elements to output the rising timing signal on the basis of the recording signal waveform and the variation detection signal, and said falling timing signal selection unit controls the selection by the one selection elements corresponding to the second delay elements to output the falling timing signal on the basis of the recording signal waveform and the variation detection signal.

9. Digital signal recording apparatus (S) comprising:

a waveform recognition unit (21) for recognizing pulse waveforms of plural kinds in the digital signal (Sre) and outputting waveform pattern signals (Sle, Ste) indicating the pulse waveforms recognized;

a timing candidate signal generation unit (16) for generating timing candidate signals (Sd) on the basis of a reference clock signal (Scl) having a period equal to a reference period (T) of the digital signal (Sre);

a timing signal producing unit (18, 19, 20) for selecting the timing candidate signal based on signals ($Scp_1 = Scp_8$) indicative of pulse transition timings in the recording signal, to produce the timing signals (Sld, Str) indicative of at least one of a rising timing and a falling timing of the recording signal (Sdd);

a generation unit (24 25, 26) for generating the recording signal (Sdd) corresponding to the pulse waveform recognized by the waveform recognition unit (21) on the basis of the timing signal (Sld, Str) and the waveform pattern signals (Sle, Ste); and a recording unit (2, 12) for recording the recording signal (Sdd) onto a storage medium (1).

\* \* \* \* \*